US006965898B2

(12) United States Patent
Aono et al.

(10) Patent No.: US 6,965,898 B2
(45) Date of Patent: Nov. 15, 2005

(54) INFORMATION RETRIEVAL SYSTEM, AN INFORMATION RETRIEVAL METHOD, A PROGRAM FOR EXECUTING INFORMATION RETRIEVAL, AND A STORAGE MEDIUM WHEREIN A PROGRAM FOR EXECUTING INFORMATION RETRIEVAL IS STORED

(75) Inventors: Masaki Aono, Yokohama (JP); Mei Kobayashi, Yokohama (JP); Hikaru Samukawa, Tokyo (JP); Hironori Takeuchi, Yokohama (JP)

(73) Assignee: International Business Machines Corp, Armonk, NY (US)

( * ) Notice: Subject to any disclaimer, the term of this patent is extended or adjusted under 35 U.S.C. 154(b) by 531 days.

(21) Appl. No.: 10/278,675

(22) Filed: Oct. 23, 2002

(65) Prior Publication Data

US 2003/0159106 A1 Aug. 21, 2003

(30) Foreign Application Priority Data

Oct. 23, 2001 (JP) ........................................ 2001-324437

(51) Int. Cl.[7] .............................................. G06F 17/00
(52) U.S. Cl. ............................................ 707/101; 707/3
(58) Field of Search .................... 707/1–10, 100–104.1, 707/200–206

(56) References Cited

U.S. PATENT DOCUMENTS 4,839,853 A * 6/1989 Deerwester et al. ........... 707/5

OTHER PUBLICATIONS

Berry et al. ("Using Linear Algebra for Intelligent Information Retrieval", Dec. 1994, pp. 2–24, ACM).*
Witter et al. ("Downdating the Latent Semantic Indexing Model for Conceptual Information Retrieval", the computer journal, 1998, vol. 41, No. 8, pp. 589–601).*
Zha et al. ("On Updating Problems In Latent Semantic Indexing", SIAM Journal on Scientific Computing, 21(2): 782–791, 1999).*
Goldberg ("What Every Computer Scientist Should Know About Floating–Point Arithmetic", ACM, vol. 23, No. 1, Mar. 1991).*

* cited by examiner

Primary Examiner—Jean M. Corrielus
Assistant Examiner—Joon Hwan Hwang
(74) Attorney, Agent, or Firm—Richard M. Goldman; Mark D. McSwain

(57) ABSTRACT

To provide an information retrieval system, a method for information retrieval, a program for executing the information retrieval, and a storage medium comprising the program for executing the information retrieval The information retrieval system according to the present invention comprises: means for generating and storing a predetermined type matrix from said document-attribute matrix, means for generating said document-attribute submatrix from documents being added to said database during a specific time period, means for updating said predetermined type matrix using knowledge with respect to said document-attribute submatrix and for executing the singular value decomposition on updated said predetermined type matrix to execute dimension reduction of all document-attribute matrices stored within said database, and means for retrieving information with respect to a user input query using said dimension reduced document-attribute matrix.

20 Claims, 25 Drawing Sheets

Fig. 4

Pseudo Code for the QR-decomposition of $D \in R^{m \times n}$

$$D = \begin{bmatrix} d_1^T \\ d_2^T \\ \vdots \\ d_m^T \end{bmatrix} = \begin{bmatrix} d_{11} & d_{12} & \cdots & d_{1n} \\ d_{21} & d_{22} & \cdots & d_{2n} \\ \vdots & \vdots & \ddots & \vdots \\ d_{m1} & d_{m2} & \cdots & d_{mn} \end{bmatrix}$$

(when information about $Q$ does not need to be stored).

for $k = 1, 2, \ldots, n$
    determine a reflector $Q_k = I - \gamma_k u^{(k)} u^{(k)T}$ such that
    $Q_k [d_{kk} \cdots d_{mk}]^T = [-\sigma_k \ 0 \ \cdots \ 0]^T$
    set $d_{kk} = -\sigma_k$
    set $[d_{k+1\,k} \cdots d_{mk}]^T$ to zero
    for $j = k+1, k+2, \ldots, n$
        $[d_{kj} \cdots d_{mj}]^T = Q_k [d_{kj} \cdots d_{mj}]^T$

Fig. 5

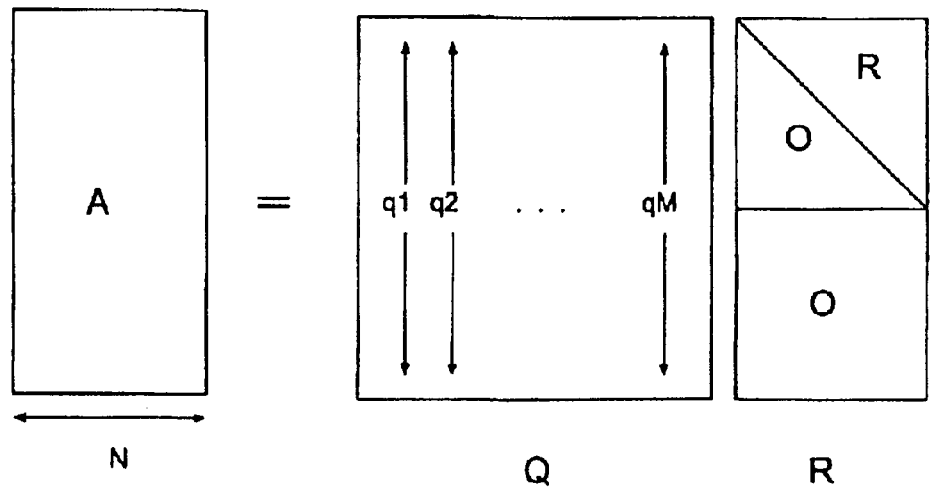

Fig. 8

Pseudo Code for Constructing Covariance Matrix (basic case, no up/downdating)

Code to determine the covariance matrix for a set of $n$-dimensional vectors
$$\{d_i \mid d_i = (d(i,1), d(i,2), \ldots, d(i,N))^T \in R^N\}_{i=1}^M,$$
where:
    $M$ is the cardinality of the set $\{d_i\}$ (unknown - to be determined),
    $D(\cdot)$ is the component-wise sum of the document vectors,
    $C(\cdot,\cdot)$ is an $N$-by-$N$ covariance matrix,
    temp is a parameter for storing intermediate results during computations.

routine for initialization
```
M = 0
for i = 1 to N
    D(i) = 0
    for j = 1 to N
        C(i,j) = 0
``` routine to compute component-wise sum of the document vectors $D$ and cardinality $M$
```
for i = 1 to end-of-stack
    for j = 1 to N
        D(j) = D(j) + d(i,j)
    M = M + 1
``` routine to compute $M \times C(\cdot,\cdot)$
```
for i = 1 to N
    for j = 1 to N
        temp = 0
        for k = 1 to M
            temp = temp + d(k,i) · d(k,j)
        C(i,j) = [temp − D(i) · D(j)/M]/M
```

Fig. 9
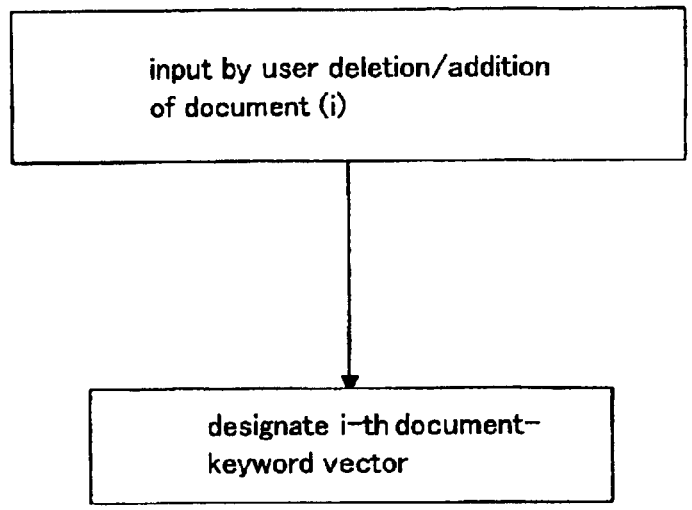
(a)
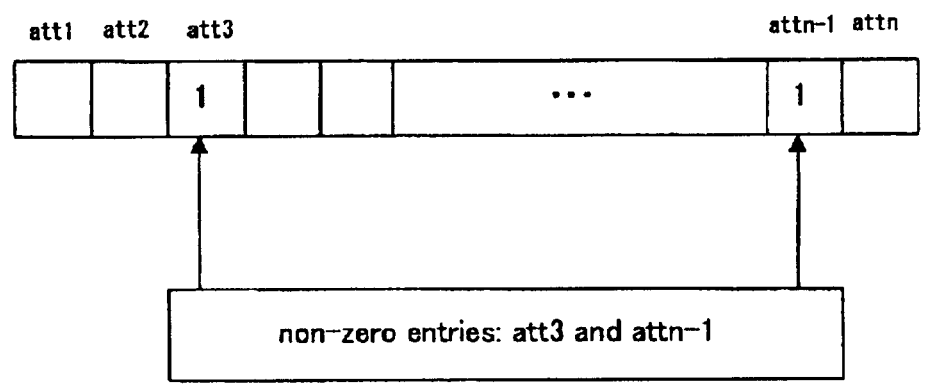
(b)

Fig. 10

|  | attribute | nos. of documents including attributes |  |
|---|---|---|---|
|  | attribute 1 | 1 |  |
|  | attribute 2 | 25 | addition → 7 |
| 5 ← deletion | attribute 3 | 6 |  |
|  |  | . . . |  |
| 32 ← deletion | attribute n-1 | 33 | addition → 34 |
|  | attribute n | 12 |  |

Fig. 17

```
 1|Clinton 1.0 AlGore 1.0 Chelsea 0.4 ↓
 2|Clinton 1.0 AlGore 1.0 Bush 0.3 ↓
 3|Clinton 1.0 AlGore 1.0 Japan 0.1 ↓
 4|Clinton 1.0 AlGore 1.0 Chelsea 0.3 ↓
 5|Clinton 1.0 AlGore 1.0 Japan 0.2 ↓
 6|Clinton 1.0 AlGore 1.0 Chelsea 0.2 ↓
 7|Clinton 1.0 AlGore 1.0 Japan 0.3 ↓
 8|Clinton 1.0 AlGore 1.0 Chelsea 0.1 ↓
 9|Clinton 1.0 AlGore 1.0 Japan 0.4 ↓
10|Clinton 1.0 AlGore 1.0 ↓
11|Clinton 1.0 AlGore 1.0 Hillary 0.5 Bush 0.3 ↓
12|Clinton 1.0 AlGore 1.0 Hillary 0.5 Chelsea 0.4 ↓
13|Clinton 1.0 AlGore 1.0 Hillary 0.5 Japan 0.1 ↓
14|Clinton 1.0 AlGore 1.0 Hillary 0.5 ↓
15|Clinton 1.0 AlGore 1.0 Hillary 0.5 Bush 0.3 ↓
16|Clinton 1.0 AlGore 0.5 Hillary 1.0 Chelsea 0.1 ↓
17|Clinton 1.0 AlGore 0.5 Hillary 1.0 Chelsea 0.4 ↓
18|Clinton 1.0 AlGore 0.5 Hillary 1.0 Japan 0.1 ↓
19|Clinton 1.0 AlGore 0.5 Hillary 1.0 ↓
20|Clinton 1.0 AlGore 0.5 Hillary 1.0 Bush 0.3 Japan 0.2 ↓
```

Fig. 18

```
 1|Clinton 1.0 Hillary 1.0 Japan 0.1 ↓
 2|Clinton 1.0 Hillary 1.0 Chelsea 0.2 ↓
 3|Clinton 1.0 Hillary 1.0 ↓
 4|Clinton 1.0 Hillary 1.0 Bush 0.3 ↓
 5|Clinton 1.0 Hillary 1.0 Chelsea 0.4 ↓
 6|Java 1.0 JSP 1.0 apache 0.1 servlet 0.4 ↓
 7|Java 1.0 JSP 1.0 servlet 0.3 ↓
 8|Java 1.0 JSP 1.0 apache 0.2 ↓
 9|Java 1.0 JSP 1.0 ↓
10|Java 1.0 JSP 1.0 apache 0.1 ↓
11|Java 1.0 JSP 1.0 servlet 0.2 ↓
12|Java 1.0 JSP 1.0 apache 0.3 ↓
13|Java 1.0 JSP 1.0 servlet 0.4 ↓
14|Java 1.0 JSP 1.0 servlet 0.1 ↓
15|Java 1.0 JSP 1.0 apache 0.1 ↓
16|Java 1.0 applet 0.5 JSP 1.0 servlet 0.2 ↓
17|Java 1.0 applet 0.5 JSP 1.0 apache 0.3↓
18|Java 1.0 applet 0.5 JSP 1.0 apache 0.2 ↓
19|Java 1.0 applet 0.5 JSP 1.0 servlet 0.1 ↓
20|Java 1.0 applet 0.5 JSP 1.0 ↓
```

Fig. 19

```
1  Java 1.0 applet 1.0 JSP 0.5 apache 0.1 ↓
2  Java 1.0 applet 1.0 JSP 0.5 servlet 0.3 ↓
3  Java 1.0 applet 1.0 JSP 0.5 servlet 0.2 ↓
4  Java 1.0 applet 1.0 JSP 0.5 servlet 0.1 ↓
5  Java 1.0 applet 1.0 JSP 0.5 ↓
6  Java 1.0 applet 1.0 apache 0.1 ↓
7  Java 1.0 applet 1.0 ↓
8  Java 1.0 applet 1.0 servlet 0.3 ↓
9  Java 1.0 applet 1.0 apache 0.2 ↓
10 Java 1.0 applet 1.0 servlet 0.1 ↓
11 Bluetooth 1.0 dream 0.1 ↓
12 Bluetooth 1.0 cat 0.1 ↓
13 Bluetooth 1.0 god 0.1 ↓
14 Bluetooth 1.0 museum 0.1 ↓
15 Bluetooth 1.0 ↓
16 soccer 1.0 center 0.1 ↓
17 soccer 1.0 spring 0.1 ↓
18 soccer 1.0 silk 0.1 ↓
19 soccer 1.0 lecture 0.1 ↓
20 soccer 1.0 ↓
```

Fig. 20

```
 1|matrix 1.0 heat 0.1 ↓
 2|matrix 1.0 power 0.1 ↓
 3|matrix 1.0 magnet 0.1 ↓
 4|matrix 1.0 gourmet 0.1 ↓
 5|matrix 1.0 ↓
 6|DNA 1.0 music 0.1 ↓
 7|DNA 1.0 shark 0.1 ↓
 8|DNA 1.0 snail 0.1 ↓
 9|DNA 1.0 montage 0.1 ↓
10|DNA 1.0 ↓
11|cat 0.3 magnet 0.4 lecture 0.2 gourmet 1.0 ↓
12|center 0.2 silk 0.3 magnet 0.2 lecture 0.3 pattern 0.2 montage 1.0 ↓
13|whisper 0.2 saga 0.2 museum 0.2 torch 1.0 ↓
14|heat 0.3 spring 0.4 power 0.2 stock 0.1 silk 0.3 flag 1.0 ↓
15|heat 1.0 dream 0.2 flag 0.3 ↓
16|music 1.0 stock 0.2 insect 0.4 flag 0.1 ↓
17|heat 0.2 dream 1.0 spring 0.3 power 0.4 god 0.2 insect 0.2 magnet 0.4 pavillion
   |0.3 pattern 0.2 ↓
18|center 1.0 spring 0.1 shark 0.3 magnet 0.4 lecture 0.3 pavillion 0.4 museum 0.4
   |↓
19|whisper 1.0 spring 0.1 god 0.3 shark 0.3 ↓
20|cat 1.0 magnet 0.3 lecture 0.2 museum 0.2 pattern 0.2 ↓
```

Fig. 21

```
 1|spring 1.0 stock 0.4 pavillion 0.4 museum 0.2 ↓
 2|power 1.0 snail 0.3 gourmet 0.3 ↓
 3|whisper 0.3 god 1.0 ↓
 4|spring 0.3 shark 1.0 snail 0.2 montage 0.4 ↓
 5|spring 0.1 stock 1.0 magnet 0.2 latitude 0.2 pavillion 0.3 pattern 0.3 ↓
 6|dream 0.2 shark 0.3 stock 0.1 insect 1.0 pavillion 0.3 museum 0.3 ↓
 7|insect 0.2 silk 1.0 ↓
 8|music 0.3 power 0.4 magnet 1.0 gourmet 0.4 flag 0.4 ↓
 9|dream 0.4 god 0.3 insect 0.3 magnet 0.3 snail 1.0 gourmet 0.2 ↓
10|heat 0.3 music 0.2 shark 0.3 insect 0.3 magnet 0.2 latitude 1.0 lecture 0.3 muse
   |um 0.3 ↓
11|whisper 0.2 shark 0.1 snail 0.3 saga 1.0 pattern 0.4 ↓
12|center 0.2 whisper 0.3 stock 0.4 silk 0.2 lecture 1.0 museum 0.4 ↓
13|music 0.3 pavillion 1.0 ↓
14|cat 0.4 snail 0.3 pavillion 0.3 museum 1.0 montage 0.4 ↓
15|music 0.4 whisper 0.4 cat 0.3 power 0.4 insect 0.4 pattern 1.0 ↓
16|dream 0.3 spring 0.2 magnet 0.2 gourmet 1.0 torch 0.2 ↓
17|dream 0.2 power 0.3 god 0.3 magnet 0.2 saga 0.3 pattern 0.2 montage 1.0 ↓
18|dream 0.2 silk 0.3 torch 1.0 ↓
19|flag 1.0 ↓
20|heat 1.0 dream 0.3 whisper 0.2 stock 0.3 snail 0.3 gourmet 0.3 torch 0.3 ↓
```

Fig. 22

```
 1 music 1.0 whisper 0.4 god 0.2 stock 0.2 insect 0.2 snail 0.4 pattern 0.4 montage
   0.4 ↓
 2 dream 1.0 center 0.3 snail 0.2 ↓
 3 center 1.0 shark 0.2 latitude 0.3 lecture 0.3 pattern 0.4 ↓
 4 dream 0.2 whisper 1.0 spring 0.4 power 0.3 lecture 0.3 gourmet 0.4 montage 0.4 f
   lag 0.2 ↓
 5 center 0.2 cat 1.0 spring 0.2 shark 0.1 gourmet 0.2 ↓
 6 spring 1.0 silk 0.2 saga 0.4 gourmet 0.4 ↓
 7 cat 0.3 power 1.0 pavillion 0.3 flag 0.2 ↓
 8 god 1.0 ↓
 9 center 0.3 god 0.1 shark 1.0 insect 0.4 snail 0.3 ↓
10 whisper 0.4 stock 1.0 silk 0.4 snail 0.4 museum 0.2 ↓
11 god 0.3 shark 0.1 insect 1.0 magnet 0.3 ↓
12 stock 0.3 silk 1.0 snail 0.3 museum 0.4 flag 0.4 ↓
13 heat 0.4 whisper 0.4 god 0.3 magnet 1.0 saga 0.2 lecture 0.1 museum 0.4 ↓
14 power 0.4 snail 1.0 museum 0.3 ↓
15 latitude 1.0 pavillion 0.4 ↓
16 stock 0.3 saga 1.0 torch 0.4 ↓
17 lecture 1.0 museum 0.2 pattern 0.2 gourmet 0.2 montage 0.2 ↓
18 music 0.2 spring 0.2 insect 0.2 latitude 0.2 pavillion 1.0 ↓
19 dream 0.2 museum 1.0 ↓
20 silk 0.1 lecture 0.3 museum 0.2 pattern 1.0 montage 0.3 ↓
```

Fig. 23

```
 1 gourmet 1.0 ↓
 2 dream 0.4 center 0.2 whisper 0.3 spring 0.3 power 0.3 montage 1.0 torch 0.3 ↓
 3 whisper 0.3 magnet 0.2 pavillion 0.2 torch 1.0 ↓
 4 heat 0.3 music 0.3 power 0.3 shark 0.4 lecture 0.4 pavillion 0.3 pattern 0.2 gou
   rmet 0.4 torch 0.2 flag 1.0 ↓
 5 heat 1.0 music 0.4 center 0.2 god 0.3 insect 0.2 latitude 0.1 saga 0.1 pattern 0
   .3 torch 0.1 ↓
 6 music 1.0 power 0.2 stock 0.4 silk 0.2 torch 0.3 ↓
 7 dream 1.0 insect 0.2 lecture 0.3 museum 0.2 ↓
 8 center 1.0 god 0.2 stock 0.2 snail 0.1 lecture 0.2 ↓
 9 whisper 1.0 cat 0.2 latitude 0.2 lecture 0.2 ↓
10 cat 1.0 pattern 0.2 gourmet 0.3 ↓
11 heat 0.4 spring 1.0 snail 0.3 saga 0.3 museum 0.2 gourmet 0.4 ↓
12 power 1.0 silk 0.3 snail 0.3 lecture 0.3 flag 0.2 ↓
13 god 1.0 lecture 0.4 museum 0.2 montage 0.4 ↓
14 power 0.3 shark 1.0 museum 0.2 montage 0.4 torch 0.2 flag 0.4 ↓
15 music 0.2 dream 0.3 spring 0.3 god 0.2 stock 1.0 montage 0.4 ↓
16 heat 0.3 dream 0.1 cat 0.2 shark 0.3 insect 1.0 pattern 0.2 ↓
17 power 0.2 stock 0.2 silk 1.0 ↓
18 magnet 1.0 latitude 0.4 montage 0.3 flag 0.4 ↓
19 dream 0.1 stock 0.2 silk 0.3 magnet 0.3 snail 1.0 lecture 0.2 museum 0.1 ↓
20 god 0.1 stock 0.2 latitude 1.0 ↓
```

Fig. 24

| 1 Clinton | 2 AlGore 12 | 3 Hillary | 4 Chelsea | 5 Bush | 6 Japan | 7 Java | 8 applet | 9 JSP | 10 apache |
|---|---|---|---|---|---|---|---|---|---|
| 11 servlet | Bluetooth | 13 soccer | 14 matrix | 15 DNA | 16 heat | 17 music | 18 dream | 19 center | 20 whisper |
| 21 cat 31 | 22 spring | 23 power | 24 god 34 | 25 shark | 26 stock | 27 insect | 28 silk | 29 magnet | 30 snail |
| latitude | 32 saga | 33 lecture | pavilion | 35 museum | 36 pattern | 37 gourmet | 38 montage | 39 torch | 40 flag |

Fig. 26 document 26: new keyword = Java
document 26: new keyword = JSP
document 26: new keyword = apache
document 26: new keyword = servlet
document 36: new keyword = applet new keyword added to data 2
these 5 are added to Hash table
to provide a total of 11 keywords SUM-MEAN($M$)$_t$ (N = 11)
[ 25.0  17.5  2.5  1.5  1.5  12.5  15.0  15.0  1.3  1.7  2.5]

SUM-MEAN($M$)$_t$ after data 2 processed

SUM($M$)$_t$ (N = 11)
25.00 17.50 2.50 1.50 1.50 12.50 0.00 0.00 0.00 0.00 0.00
      16.25 1.65 1.05 1.25 5.00 0.00 0.00 0.00 0.00 0.00
            0.83 0.00 0.00 1.30 0.00 0.00 0.00 0.00 0.00
                 0.45 0.06 0.90 0.00 0.00 0.00 0.00 0.00
                      0.37 0.45 0.00 0.00 0.00 0.00 0.00
                           11.25 0.00 0.00 0.00 0.00 0.00
                                 15.00 15.00 1.30 1.70 2.50
                                       15.00 1.30 1.70 2.50
                                             0.29 0.04 0.25
                                                  0.51 0.15
                                                       1.25

SUM($M$)$_t$ after data 2 processed
becomes 11x11 symmetry matrix

Fig. 29

Singular value
(Largest 10)

| AlGore |
| Clinton |
| Hillary |
| Chelsea |
| Bush |
| Japan | keywords deleted in deletion of data 1 and data 2

Fig. 31

Singular value
(largest 10)

Singular value
(Largest 10)

```
0.1987144620508
0.0690170884491
0.0566614854733
0.0537575326572
0.0514825460617
0.0502895403078
0.0502170789069
0.0497783735463
0.0480041373927
0.0467372731528
```

INFORMATION RETRIEVAL SYSTEM, AN INFORMATION RETRIEVAL METHOD, A PROGRAM FOR EXECUTING INFORMATION RETRIEVAL, AND A STORAGE MEDIUM WHEREIN A PROGRAM FOR EXECUTING INFORMATION RETRIEVAL IS STORED

DETAILED DESCRIPTION OF THE INVENTION

1. Technical Field

The present invention relates to retrieval of information of data retained in a database, more particularly, the present invention relates to an information retrieval system for an extremely large database whereto information is added successively and wherein information is updated, an information retrieval method, a program for information retrieval and a storage medium readable by a computer wherein the program is stored.

2. Prior Art

It can be said that an information retrieval system using a vector space model of a document is relatively successful for an extremely large static database. Deerwester et al. have developed the latent semantic indexing, which is an algorithm for mapping a problem related to retrieval of information of a text-based document into a lower order subspace, to make it possible for retrieval at an actual time. The algorithm of Deerwester et al. is based on efficient and numerically accurate calculation of the singular value decomposition (SVD) of a document-attribute matrix. The above method of Deerwester et al. is highly precise and satisfactory. However, a basic vector of the subspace used for the method is determined normally by a calculation including the SVD for document data even when there is a request for successive addition or deletion of document data. Therefore, this method is disadvantageous in that the cost thereof is high and the calculation takes, for example, ten hours.

The algorithm for deleting a dimension based on the above SVD in information retrieval is not appropriate for retrieving information from an extremely large database whereto information is added very quickly such as a news database, medical care database and a consumer profile database. The main reasons for this are: (1) each database need be frequently updated through a process referred to as updating or downdating in this description in consideration of information added newly and, at the same time, to delete information with an old date or unnecessary information and (2) each time a database is updated (or downdated) to deal with a change of the contents in the database, a basic vector needs to be calculated for a document-attribute matrix and the cost therefore increases very largely regarding a calculation time, a required labor and hardware resources.

DISCLOSURE OF PRIOR ARTS

In order to resolve above problems, several methods have been proposed. Berry, Dumais and O'Brien have proposed a method for updating, that is to say, adding a document under the vector space model regarding deletion of a dimension based on SVD in "Using linear algebra for intelligent information retrieval", 1995, pp. 537–595, and Zha and Siomon have proposed the same method in "On updating problems in latent semantic indexing", SIAM Journal of Scientific Computation, Vol. 21, No. 2, pp. 782–791, March 2000. However, since the method of Berry et al. is only an approximation of updating for the vector space model instead of being an accurate calculation of the same, this method has a disadvantage of insufficient reliability.

The updating method for an algorithm of Berry et al. (1995) and Zha et al. (2000) is also a linear approximate solution for SVD and has a disadvantage of insufficient reliability.

On the other hand, Witter has disclosed a downdating method for an algorithm of Deerwester et al. in "Downdating the latent semantic model for information retrieval", M. A. Thesis, Univ. of Tennessee, Knoxville, December 1997. However, when the Witter's method is applied to downdating of a database which changes quickly, the following problems arise: (1) since all documents are deleted at one time, errors in floating-point calculations for subsequent downdating are accumulated resulting in a severe adverse influence and (2) since only a document-attribute matrix with dimensions thereof reduced are downdated, the matrix with dimensions thereof reduced cannot detect a small number but important so-called outlier documents and will contain only main topics as deletion of documents progresses. This problem is also described in details in Japanese Patent Application No. 2001-205183 by the applicants of this patent.

For the above reason, a document-attribute matrix downdated by the Witter's algorithm is output in accurately and the Witter's algorithm is therefore not appropriate for many purposes including information retrieval. In addition, a study of errors in floating-point calculations is described in the most standard texts of numerical analysis including Golub and Van Loan, "Matrix Computations", Ver. 2, John Hopkins Univ. Press, Baltimore, Md., 1989 and the review thesis by Goldberg "What every computer scientist should know about floating-point arithmetic", ACM Computing Surveys, Vol. 23, No. 1, March 1991.

Further, a satisfactory precise and efficient method for updating a document-attribute matrix with a dimension thereof reduced which is appropriate enough for the purpose of information retrieval based on the SVD including information retrieval from a database which changes quickly is unknown. Examples of important classes for the purpose of updating requiring precision and efficiency include detecting and tracing new topics/events in a database proposed by the applicants of this patent application.

On the other hand, in consideration of the process of the SVD of a common document-attribute matrix A may be given by the following formula:

$$A = U \Sigma V^t \qquad \text{[Formula 1]}$$

(wherein, U and V represent orthogonal matrices, S represents a diagonal matrix and T represents a transposition of a matrix. These symbols represent the same items in the present invention).

In this case, SVD of the above matrix A may be executed as an eigenvalue problem of $A^T A$ or $AA^T$. However, in the case of $A^T A$ or $AA^T$ generation, a problem arises in that a precision of a small singular value is deteriorated intensely resulting in extreme deterioration of output precision when SVD is executed repeatedly for updating a document-attribute matrix.

PROBLEMS TO BE SOLVED BY THE INVENTION

That is to say, the objective of the present invention is to provide an information retrieval system employing the SVD for retrieving information from an extremely large database that changes quickly at an actual time, an information retrieval method, a program for making a computer execute information retrieval and a storage medium wherein the program for executing information retrieval is stored.

MEANS OF SOLVING PROBLEMS

The present invention was made based on an original idea of reusing a part of previous calculation results of a document-attribute matrix to attain a short calculation time, precision improvement and efficiency in resolving the above problems.

According to the present invention, the QR decomposition of a document-attribute matrix is executed as a process of using the above previous calculation results and a matrix R generated immediately before included in already-calculated results of QR decomposition are used as a document-attribute matrix including newly added documents. Specifically, matrices including the matrix R and added document-attribute submatrices are converted into Householder matrices and results of added document-attribute submatrices are reflected to updating the matrix to the new matrix R.

In the present invention, a computer is made to execute a dimension deletion process in high precision and efficiency in a database whereto data is added quickly by using singular vectors obtained using an upper triangular matrix R updated as described above for the SVD to reduce dimensions of a document-attribute matrix.

Further, according to another embodiment of the present invention, a covariance matrix generated regarding a document-attribute matrix is updated using a predetermined matrix related to the covariance matrix calculated previously regarding a document-attribute matrix comprising added documents. In the present invention, an attribute may also be added or deleted when a covariance matrix is updated. High precision and efficiency of the dimension deletion process are attained by using singular vectors generated by executing the SVD on the covariance matrix obtained as described above to reduce dimensions of a document-attribute matrix.

That is to say, updating a singular value triplet (a singular value and a left or right singular vector opposing thereto) of a document-attribute matrix which changes dynamically according to the present invention may provide a more accurate numeric result than any of the above results proposed by the prior arts. According to the present invention, SVD of an updated matrix is calculated quickly in particular together with making a computer execute a numerically accurate calculation instead of providing an approximation of a singular value triplet.

Further, since the present invention deals with a plurality of times of updating, accumulation of floating point errors may be minimized. In general, since a quality of result output using the SVD for a dimension deletion problem by the information retrieval system depends on a precision of a calculated triplet, the present invention may provide a more excellent result than any of the disclosed methods of the prior arts.

Still further, since the present invention may calculate updating accurately based on the SVD of a document-attribute matrix, the present invention may be employed for detection of data such as documents from a database with the contents thereof change extremely including detection of new topics/events. Furthermore, the method according to the present invention may be applied to tracing topics/events as described in Japanese Patent Application Nos. 2000-175848 and 2001-157614.

That is to say, the present invention provides an information retrieval system for retrieving documents to a database with a lapse of time. These documents are converted into a document-attribute matrix and retained in the information retrieval system. The document-attribute matrix comprise document-attribute submatrices added successively. The information retrieval system comprises:

means for generating and storing a predetermined type matrix from the document-attribute matrix, means for generating the document-attribute submatrix from documents being added to the database during a specific time period, means for updating the predetermined type matrix using knowledge with respect to the document-attribute submatrix and for executing the singular value decomposition on the updated predetermined type matrix to execute dimension reduction of all document-attribute matrices stored within the database, and means for retrieving information with respect to a user input query using the dimension reduced document-attribute matrix.

The present invention may comprise a means of making it possible to execute the QR decomposition of the document-attribute submatrices and use only a matrix R as the predetermined matrix. The present invention may comprise a means of making a computer update the stored matrix R by a Householder transformation related to the document-attribute submatrices.

The present invention may comprise means of generating a covariance matrix as the predetermined matrix from the document-attribute submatrices and retaining a product sum matrix of document vectors ($SUM(M)_1$), a mean value of document vectors ($MEAN(M)_1$), a mean product matrix of document vectors ($SUM(M)_2$) and a total number of documents (M). The present invention may further comprise a means of generating a covariance matrix C' of all a document-attribute matrix including the added submatrices from the following formula:

$$C' = \frac{1}{(M+H)} SUM(M+H)_1 - SUM(M+H)_2$$

(wherein, H represents the number of documents of added submatrices). The present invention furthermore comprises means of retrieving an attribute contained in a document vector automatically and generating an attribute hash table to add or delete the attribute.

The present invention provides an information retrieval method for retrieving documents added to a database with a lapse of time.

These documents are converted into a document-attribute matrix and stored in the information retrieval system.

This document-attribute matrix is comprised of document-attribute submatrices added successively.

The information retrieval method comprises the steps of:

generating and storing a predetermined type matrix from the document-attribute matrix, generating the document-attribute submatrix from documents being added to the database during a specific time period, updating the predetermined type matrix using knowledge with respect to the document-attribute submatrix and for executing singular value decomposition on the updated predetermined type matrix to execute dimension reduction of all document-attribute matrices stored within the database, and retrieving information with respect to a user input query using the dimension reduced document-attribute matrix.

The present invention further provides a program for making a computer execute the information retrieval method to retrieve documents added to a database with a lapse of time.

These documents are converted into a document-attribute matrix and retained.

This document-attribute matrix is comprised of document-attribute submatrices added successively.

The program comprises the steps of:

generating and storing a predetermined type matrix from the document-attribute matrix, generating the document-attribute submatrix from documents being added to the database during a specific time period, updating the predetermined type matrix using knowledge with respect to the document-attribute submatrix and for executing singular value decomposition on the updated predetermined type matrix to execute dimension reduction of all document-attribute matrices stored within the database, and retrieving information with respect to a user input query using the dimension reduced document-attribute matrix.

The present invention furthermore provides a storage medium readable by a computer wherein a program for making a computer execute an information retrieval method to retrieve documents added to a database with a lapse of time is stored. These documents are converted into a document-attribute matrix and retained. The document-attribute matrix comprises document-attribute submatrices added successively.

A storage medium readable by a computer wherein a program for making a computer execute an information retrieval method to retrieve documents, said documents being converted into document-attribute matrix and stored within said information retrieval system, and said document-attribute matrix being constituted by document-attribute submatrices added in order with respect to time, said program making a computer execute said information retrieval method is provided. The program comprises the steps of:

generating and storing a predetermined type matrix from the document-attribute matrix, generating the document-attribute submatrix from documents being added to the database during a specific time period, updating the predetermined type matrix using knowledge with respect to said document-attribute submatrix and for executing the singular value decomposition on the updated predetermined type matrix to execute dimension reduction of all document-attribute matrices stored within said database, and retrieving information with respect to a user input query using said dimension reduced document-attribute matrix.

BRIEF DESCRIPTION OF DRAWINGS

FIG. 4 is a view showing a pseudo code for executing the QR decomposition for a common matrix D.

FIG. 5 is a schematic view showing components of a matrix obtained by the QR decomposition of a matrix A.

FIG. 8 is a view showing the pseudo code for generating a covariance matrix used in step S11 shown in FIG. 7.

FIG. 9 is a schematic view showing a process of changing an attribute hash table.

FIG. 10 is a view showing the attribute hash table used in the present invention.

FIG. 17 is a view showing each of the files shown in FIG. 16.

FIG. 18 is a view showing each of the files shown in FIG. 16.

FIG. 19 is a view showing each of the files shown in FIG. 16.

FIG. 20 is a view showing each of the files shown in FIG. 16.

FIG. 21 is a view showing each of the files shown in FIG. 16.

FIG. 22 is a view showing each of the files shown in FIG. 16.

FIG. 23 is a view showing each of the files shown in FIG. 16.

FIG. 24 is a view showing an example of a keyword used in the present invention.

FIG. 26 is a view showing a result obtained by adding data by updating data2.

FIG. 29 is a view showing the singular values obtained by executing singular value decomposition directly on a matrix provided from the first time as data shown in Table 5 to 10.

FIG. 30 is a view showing keywords to be deleted.

FIG. 31 is a view showing singular values obtained by a covariance matrix downdated by the method according to the present invention.

FIG. 32 is a view showing singular values obtained by generating a covariance matrix directly by downdating data from the data shown in Tables 5 to 10 in advance.

BEST MODE FOR CARRYING OUT THE INVENTION

Figure 1:
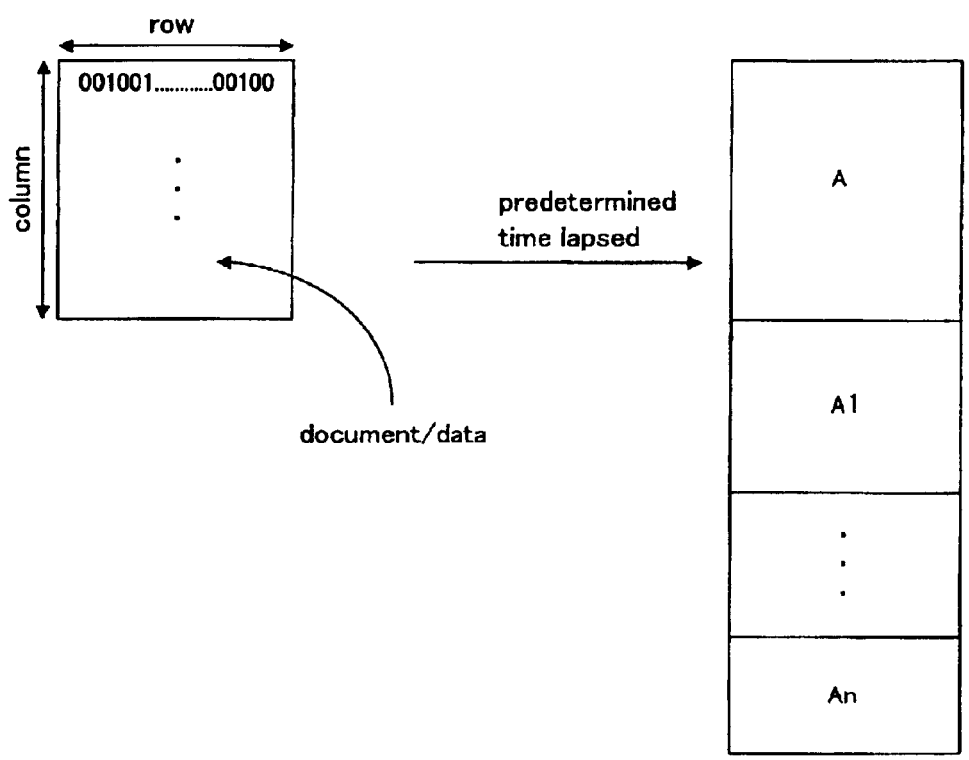
FIG. 1 is a view showing an overview of a configuration of a database used in the present invention.

The present invention will be described with reference to embodiments shown in the drawings. However, the present invention is not limited to specific embodiments described later.

FIG. 1 is a view showing an outlined structure of a database for executing information retrieval according to the present invention. In the database shown in FIG. 1, documents are converted into document vectors by employing an appropriate method such as a binary model or attribute frequency model. FIG. 1 shows the data structure of the database as a document-attribute matrix generated from the above documents. In FIG. 1, document vectors are listed in a row direction. In a column direction, appropriate weights are listed when the documents contains predetermined attributes. When the documents do not contain predetermined attributes, numerical elements are listed by a method of making all numerical values 0.

In addition to the binary model shown in FIG. 1, the present invention may provide an attribute frequency model whereto a weight factor specified by a user is applied. A matrix obtained as described above is hereinafter referred to as a document-attribute matrix A in the present invention. Any attribute such as a time stamp, an image or audio data may be used in addition to a keyword attribute used for text document data in the present invention.

As shown in FIG. 1, in the present invention, document/data are frequently added to the database and the documents are converted into document vectors according to attributes contained in the documents. These document vectors are partitioned into units of, for example, days, weeks, months or units set by a database manager, and constructed as submatrices thereof A1 to An.

For example, a set of document vectors first accumulated in the database is partitioned as a matrix A and processed. A set of document vectors added thereafter is gathered in a predetermined period of time, for example one week, and constructed as a document-attribute matrix. This document-attribute matrix is shown as a submatrix A1 in FIG. 1. Similarly, the newest submatrix of all sets of successively added document vectors gathered in predetermined periods of time is shown as a submatrix An in FIG. 1.

An above predetermined period of time may be a day unit, a week unit, or a month unit. However, the predetermined period of time is not always a specific period of time. Data accumulated up to a specific time point may be gathered to a submatrix Ai as necessity. The present invention attains efficiency by using the above submatrices for calculating an upper triangular matrix R or a covariance matrix obtained by QR decomposition. This calculation reduces a labor required to execute the SVD for all a document-attribute matrix whereto data is accumulated at one time resulting in reduction of a calculation time for dimension deletion. The present invention further make it possible to improve retrieval precision by reducing possibility of ignoring so-called outlier documents as much as possible. These outlier documents are important and contained in the database however for only a few percent of a data amount. Embodiments of the present invention will be described in details.

<First Embodiment>

In the first embodiment of the present invention, the QR decomposition is applied to a matrix comprising the above submatrices and a matrix R obtained up to the previous time and SVD is applied to obtain a new upper triangular matrix R to obtain singular vectors. Thereafter, a singular matrix comprising singular vectors from the largest vector to the kth vector to reduce dimensions of a document-attribute matrix contained in the database to k dimensions.

Figure 2:
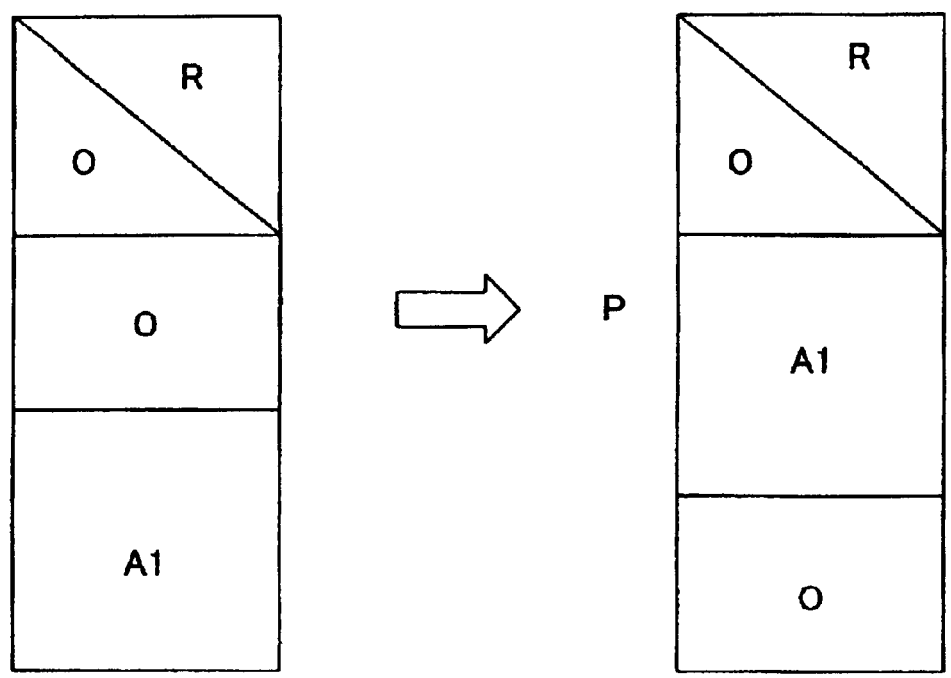
FIG. 2 is a view showing updating at the time when a submatrix A1 is added.

Further, the submatrix A1 retains the original document-attribute A in the format of being added to the bottom of the matrix R obtained by the QR decomposition as shown in FIG. 2.

The part where the submatrix Ai is added to the left matrix R shown in FIG. 2 is moved to immediately under the matrix R by an appropriate orthogonal replacement matrix P.

Figure 3:
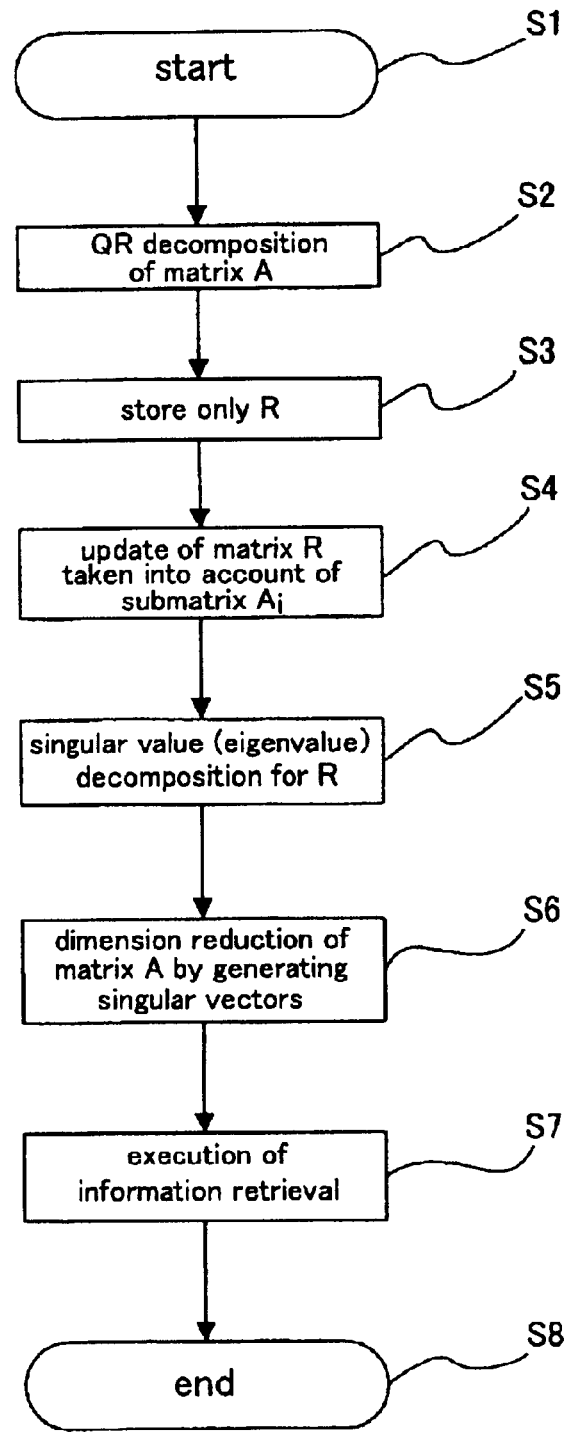
FIG. 3 is a flowchart of an information retrieval method using a QR decomposition method according to the present invention.

FIG. 3 is a flowchart showing a process of employing the QR decomposition method to reduce dimensions of the document-attribute matrix A as the first embodiment of the present invention. As shown in FIG. 3, the process begins from step S1 and then executes the QR decomposition of the document-attribute matrix A in step S2. In step S3, only the matrix R of matrices Q and R obtained by the QR decomposition are used. The reasons why only the matrix R is used in the present invention are: (a) since the matrix R is an upper triangular matrix, a calculation for the SVD may be executed very quickly and (b) even when the matrix R is used as shown in the following formula, the singular values or eigenvalues are saved in a document-attribute matrix.

$$A^T A = (QR)^T QR = R^T Q^T QR = R^T R \quad \text{[Formula 2]}$$

Subsequently, in the process shown in the first embodiment of the present invention, the submatrix Ai added in step S4 is used to update a matrix R. At this time, calculation of the updated matrix R will be described in details in a preferable embodiment of the present invention. In step S5, the matrix R obtained as described above is used to execute the SVD.

$$R = U\Sigma V^1 \quad \text{[Formula 3]}$$

(Wherein U and V represent an N×N normal orthogonal matrix and S represents an N×N orthogonal matrix.)

As described above, the same singular values as those of a document-attribute matrix are retained as the singular value or eigenvalues of the matrix R obtained as described above. Further, since matrix R is an upper triangular matrix, the SVD may be executed very easily so as to greatly reduce a calculation time assigned to the SVD which has required an extremely long time for calculation in a conventional process.

Further, in the process of the present invention, the singular vectors or eigenvectors are obtained from the singular values obtained in step S6 and a singular matrix with dimensions thereof reduced to k dimensions by using the singular vectors or eigenvectors from the vector having the largest singular value or eigenvalue to the kth vector of the obtained singular vectors or eigenvectors are generated to reduce dimensions of a document-attribute matrix.

In step S7, a matrix with the number of dimensions thereof reduced is used to retrieve information. In step S8, the information retrieval method according to the first embodiment of the present invention is ended.

Processing in various steps will be described in details. Primarily, in step S2, the QR decomposition is executed for the document-attribute matrix A. The QR decomposition on A is represented by the following formula.

$$[A] = [Q] \begin{bmatrix} R \\ O \end{bmatrix} \quad \text{[Formula 4]}$$

Wherein the matrix represented by O represents a matrix with all elements set to 0. FIG. 4 shows a pseudo code to make a computer execute the above QR decomposition for a common matrix D.

In step S3 of the present invention, only the matrix R obtained by the above QR decomposition is used regarding to the matrix A. FIG. 5 is a schematic view of components of a matrix obtained by the QR decomposition of the matrix A. In FIG. 5, M represents the number of documents and N represents the number of attributes. Further, in FIG. 5, q$_i$ (i=1, ..., M) represents a column vector of a matrix Q and 0 represents a part where an element of a matrix R is zero. Still further, in the embodiment shown in FIG. 5, the matrix R is obtained as an upper triangular matrix of N×N.

In step S4 of the present invention, the Householder transformation is further executed for a document-attribute matrix whereto data is added as a submatrix Ai.

In step S5 of the present invention, SVD is applied directly to the matrix R to obtain a singular value or an eigenvalue of the R matrix. At this time, various known methods, for example, a Householder transformation and the Lanczos method may be used for the SVD.

In step S6 of the present invention, singular vectors or eigenvectors are further generated from the singular values or the eigenvalues obtained by the SVD calculation in step S6, the predetermined number of singular vectors or eigenvectors are listed in descending order from the vector having the largest singular value or the largest eigenvalue to form a singular matrix. Thereafter, a document-attribute matrix A is multiplied by the formed singular matrix to reduce dimensions of the document-attribute matrix A according to the following formula (5).

$$Ak = Uk\Sigma kVk^T \quad \text{[Formula 5]}$$

Figure 6:
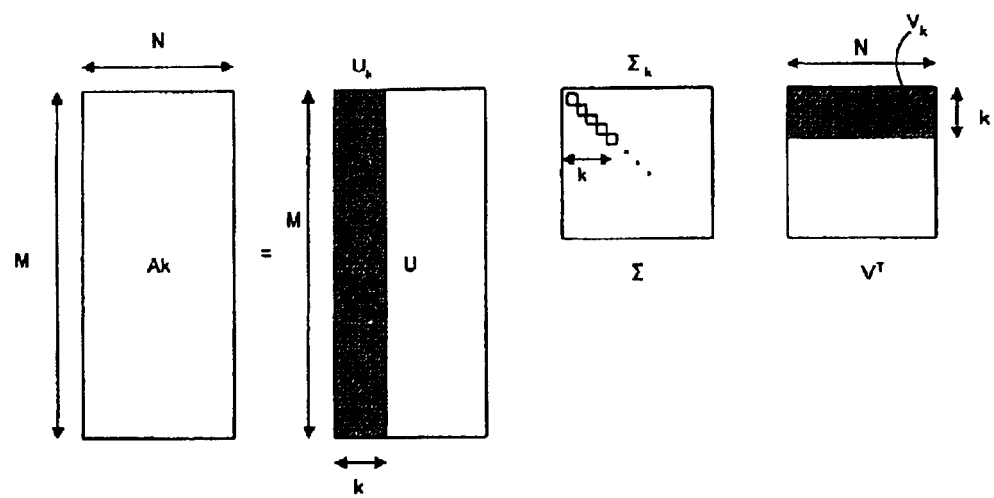
FIG. 6 is a view showing dimension reduction to k dimensions by the singular value decomposition.

As shown in FIG. 6, in the above formula, Ak represents a document-attribute matrix with dimensions thereof reduced obtained by using singular values up to the kth value, Sk represents a diagonal matrix with k×k dimensions comprising k singular values, Uk represents a matrix comprising left singular vectors against the k singular values and Vk represents a matrix comprising right singular vectors against the k singular values.

In step S7, the document-attribute matrix with dimensions thereof reduced as described above to execute multiplication with a query vector to make a computer execute information retrieval based on the query vector desired by a user.

Reduction of dimensions of the document-attribute matrix A in the first embodiment of the present invention may directly provide the matrix R obtained by the QR decomposition to the SVD while updating the matrix R so as to execute SVD in high precision together with reducing the calculation time for dimension reduction as described above. Consequently, highly precise and highly efficient information retrieval may be executed while saving memory resources.

<Second Embodiment>

In the second embodiment of the present invention, the covariance matrix for the already-calculated previous document-attribute matrix A is used to generate a new covariance matrix including a newly added submatrix A1 in the dimension reduction process using a covariance matrix. A new covariance matrix whereto the submatrix A1 obtained in the above process is reflected is provided to the SVD process. The second embodiment of the present invention may deal with addition of documents in addition to being easily applicable to deletion of documents.

The second embodiment of the present invention will be described in details. Before describing the second embodiment of the present invention in details, overview of information retrieval using a covariance matrix will be described. For the document-attribute matrix A comprising M×N elements, the covariance matrix C thereof is given by the following formula:

$$C = \frac{1}{M}\sum_{i=1}^{M} d_i d_i^T - {}^{bar}d(M){}^{bar}d(M)^T \quad \text{[Formula 6]}$$

$$= \frac{1}{M}\text{SUM}(M)_1 - \text{SUM}(M)_2$$

wherein, SUM(M)$_1$ is a product sum matrix of a document vector, SUM(M)$_2$ is a mean product matrix of document vectors. d$_i$, $^{bar}$d(M) and $^{bar}$d(M)$_1$ are each defined using elements i and j of the document-attribute matrix A by the following formula. Among them, SUM(M)$_1$ and SUM(M)$_2$ are symmetric N×N square matrices.

$$d_i = [d(i,1), \ldots, d(i,N)]^T \quad \text{[Formula 7]}$$

$$^{bar}d(M) = [^{bar}d(M)_1, \ldots, ^{bar}d(M)_N]^T$$

$$^{bar}d(M)_i = \frac{1}{M}\sum_{j=1}^{M} d(j,i)$$

The defined covariance matrix is obtained as an N×N square matrix as described above. Further, the singular values or the eigenvalues of the covariance matrix save singular values or eigenvalues of a document-attribute matrix as, for example, described in Japanese Patent Application No. 2000-175848. Furthermore, since the covariance matrix is a square matrix, even when the number of documents are extremely large, the singular values or the eigenvalues or even the singular vectors or the eigenvectors may be calculated quickly so as to make it possible to execute highly efficient information retrieval.

Figure 7:
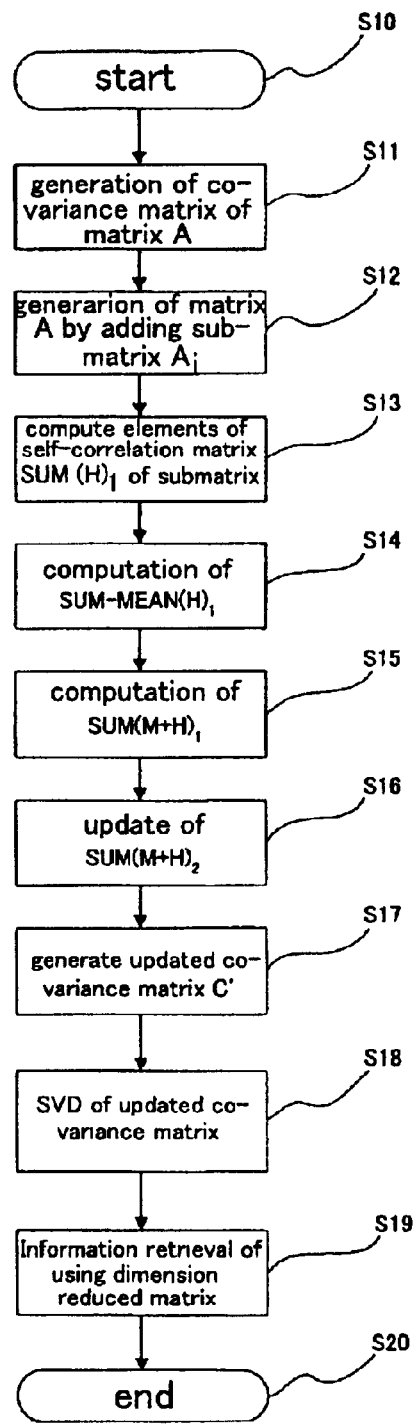
FIG. 7 is a view showing a flowchart of the information retrieval method according to the second embodiment of the present invention.

FIG. 7 is a flowchart showing the information retrieval method according to the second embodiment of the present invention. In addition, in the second embodiment of the present invention, a structure of a document-attribute matrix is also described assuming that the same is constructed by A and successively accumulated submatrices A1, A2, ..., An. The following embodiments will be described assuming that a covariance matrix is started forming from a matrix A.

As shown in FIG. 7, the second embodiment of the information retrieval method according to the present invention starts from step S10 and in step S11, a covariance matrix is generated from the matrix A according to the above formula.

In step S12, a submatrix A1 containing H document vectors are added to the matrix A so as to form a document-attribute matrix. In step S13, a computer is made to execute the calculation of the following formula from the document-attribute matrix of the submatrix A1.

$$\text{SUM}(H)_1 = \sum_{i=1}^{H} d_{M+i} d_{M+i}^T \quad \text{[Formula 8]}$$

Further, in step S14, the computer is made execute the calculation of the following formula.

$$\text{SUM-MEAN}(H)_1 = \sum_{j=1}^{H} d(M+j, i) = H\text{ MEAN}(H)_1 \quad \text{[Formula 9]}$$

Subsequently, in step S15, the computer is made execute the calculation of the following formula.

$$\text{SUM}(M+H)_1 = \text{SUM}(M)_1 + \text{SUM}(H)_1 \quad \text{[Formula 10]}$$

The relationship given by the following formula is established for each component.

$$^{bar}d(M+H)_1 = \frac{1}{M+H}\sum_{j=1}^{M+H}d(j,i) \quad \text{[Formula 11]}$$

$$= \frac{1}{M+H}(M^{bar}d(M)_1 + H^{bar}d(H)_1)$$

Subsequently, SUM-MEAN$(M+H)_1$ is updated using the following formula. Since this calculation may be executed only by addition of N times, the calculation time may be reduced.

SUM-MEAN$(M+H)_1$=SUM-MEAN$(M)_1$+
SUM-MEAN$(H)_1$               [Formula 12]

Subsequently, in step S16, SUM$(M+H)_2$ is updated using SUM-MEAN$(M+H)_1$ according to the following formula.

$(M+H)^2$SUM$(M+H)_2$=
SUM-MEAN$(M+H)_1$SUM-MEAN$(M+H)_1{}^T$    [Formula 13]

After this update, an updated covariance matrix C' may be obtained according to the following formula.

$$C' = \frac{1}{(M+H)}\text{SUM}(M+H)_1 - \text{SUM}(M+H)_2 \quad \text{[Formula 14]}$$

Thereafter, the covariance matrix C' updated in step S17 is provided for SVD to obtain the singular values or the eigenvalues and the singular vectors or the eigenvectors corresponding to k singular values or eigenvalues from the largest value are selected to generate a singular matrix or eigenmatrices with dimensions thereof reduced. In step S18, k singular matrices, eigenvectors or singular vectors with dimensions thereof reduced are used to reduce dimensions of the document-attribute matrix A, the computer is made to execute information retrieval in step S19 and the process according to the second embodiment of the present invention is ended in step S20. FIG. 8 shows a pseudo code for generating the covariance matrix described in step S11 included in the above process of the present invention.

Further, in the present invention, a case wherein document vectors are reduced for some reason may be dealt with easily by generating SUM$(M-H)_1$ and repeating calculations in the same manner.

Still further, in the embodiment of the present invention, attributes themselves may be updated or downdated. The attributes are updated when a new attribute is added. The attributes are reduced when, for example, the attributes are unrealistic in retrieval or the attributes are not necessarily retrieved. Attributes are added and deleted using an attribute hash table.

FIG. 9 is a view showing a process of changing the attribute hash table in addition or deletion of documents applied to the second embodiment of the present invention. As shown in FIG. 9(a), when a user requests to add/delete a document (i), an appropriate method such as a binary model is employed primarily to form a document vector in a case of adding the document (i). Further, when a user makes an attempt to delete the document (i), the document (i) to be deleted is specified.

Subsequently, as shown in FIG. 9(b), a non-zero attribute AT contained in the document (i) is specified. FIG. 9(b) shows that non-zero attributes att3 and attn−1 contained in the document (i) correspond to values 1. When a weighting is applied to each attribute AT in the present invention, a non-zero element may be a value other than 1 corresponding to a weight factor.

As described above, when a non-zero attribute in the document (fi) is specified, the attribute hash table shown in FIG. 10 is referenced in the present invention.

In the attribute hash table, each attribute and the number of documents containing the attribute are stored correspondingly so that the number of documents may be referenced from an attribute. The embodiment of adding/deleting documents will be described with reference to FIG. 10. For example, when the document (i) containing an attribute 3 and an attribute n−1 is added/deleted, the number of documents originally containing the attribute 3 is changed from 6 to 7 in the case of addition or to 5 in the case of deletion.

Similarly, in the case of the embodiment shown in FIG. 10, since the attribute n−1 is also a non-zero element, the number of documents originally related to the attribute n−1 is changed from 33 to 34 or 32 in accordance with addition/deletion. Documents having predetermined attribute may also be referable from the above attribute hash table by further using other identifiers.

Figure 11:
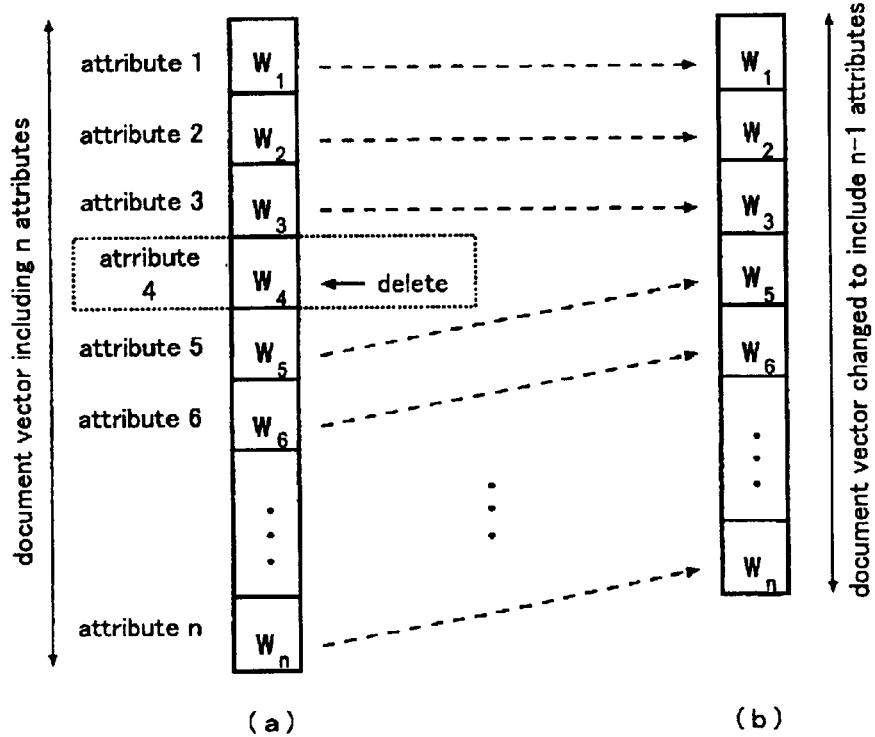
FIG. 11 is a schematic view showing deletion of an attribute.

FIG. 11 shows a schematic view of the case wherein the computer is made to execute the above attribute deletion. FIG. 11(a) shows a structure of a document vector before an attribute thereof deleted. FIG. 11(b) shows the structure of the document vector after the attribute thereof deleted. FIG. 11 shows an embodiment of deleting an attribute 4. In the present invention however, any locations of attributes to be deleted or any number of attributes to be deleted at one time other than those shown in FIG. 11 may be used.

Figure 12:
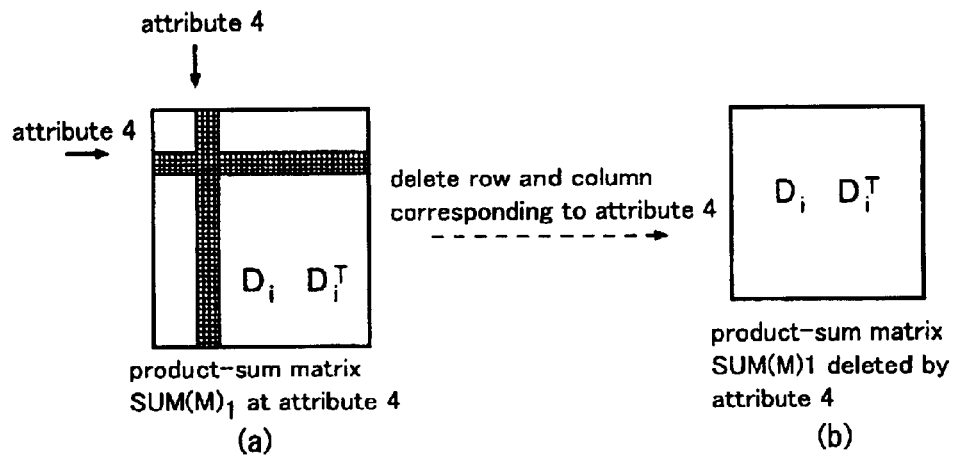
FIG. 12 is a view showing a relationship between deletion of an attribute and a matrix to be generated.

FIG. 12 is a view exemplifying a change of a product sum matrix of a document vector in the case of deleting the attribute 4 shown in FIG. 11. FIG. 12(a) shows a product sum matrix obtained by a product sum of a document vector before the attribute 4 thereof is deleted. FIG. 12(b) shows a product sum matrix obtainable from a document vector after the attribute 4 thereof deleted. As described above, a product sum matrix is used to generate a covariance matrix in the present invention, addition and deletion of attributes may also be included easily.

Figure 13:
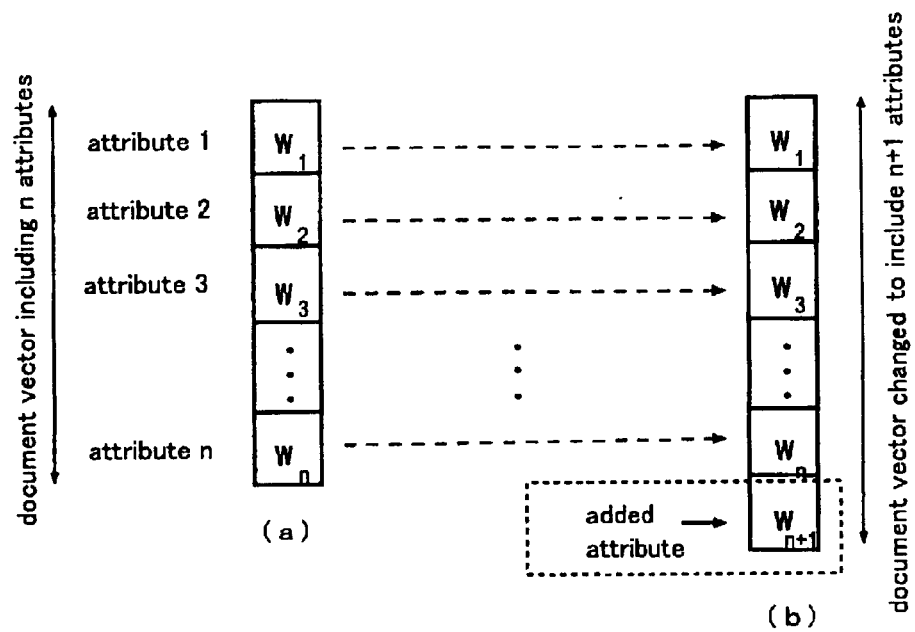
FIG. 13 is a view showing a relationship between addition of an attribute and a matrix to be generated.
Figure 14:
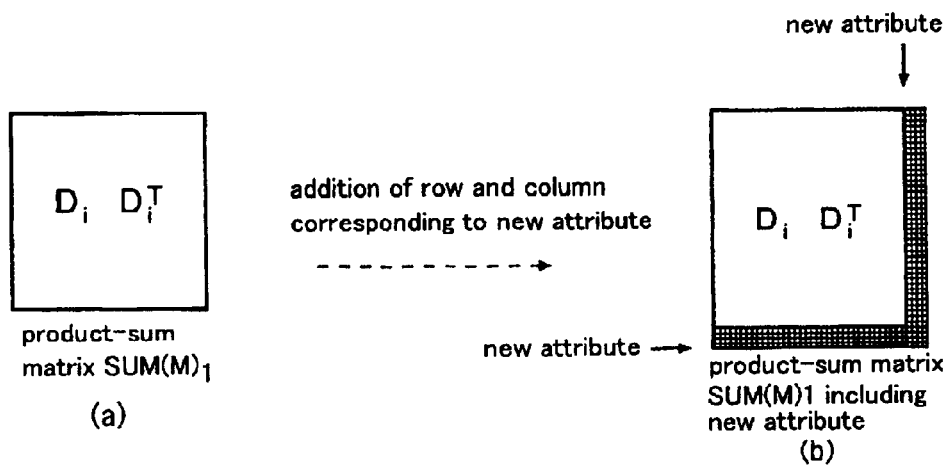
FIG. 14 is a view showing a relationship between addition of an attribute and a matrix to be generated.

FIG. 13 is a schematic showing processing for adding an attribute. In the embodiment shown in FIG. 13, a document vector whereto an attribute is not yet added. As shown in FIG. 13(b), the attribute n+1 is added to this document vector. FIG. 14 shows a (n+1)×(n+1) matrix formed by a product sum from a document vector containing the attribute n+1.

The above conventional covariance matrix is created on the premise that the number of documents and the number of attributes contained in document data used are known in advance. On the contrary, the present invention enables a computer to execute calculations successively from a primary state wherein neither the total number of documents nor the number of attributes is known.

Figure 15:
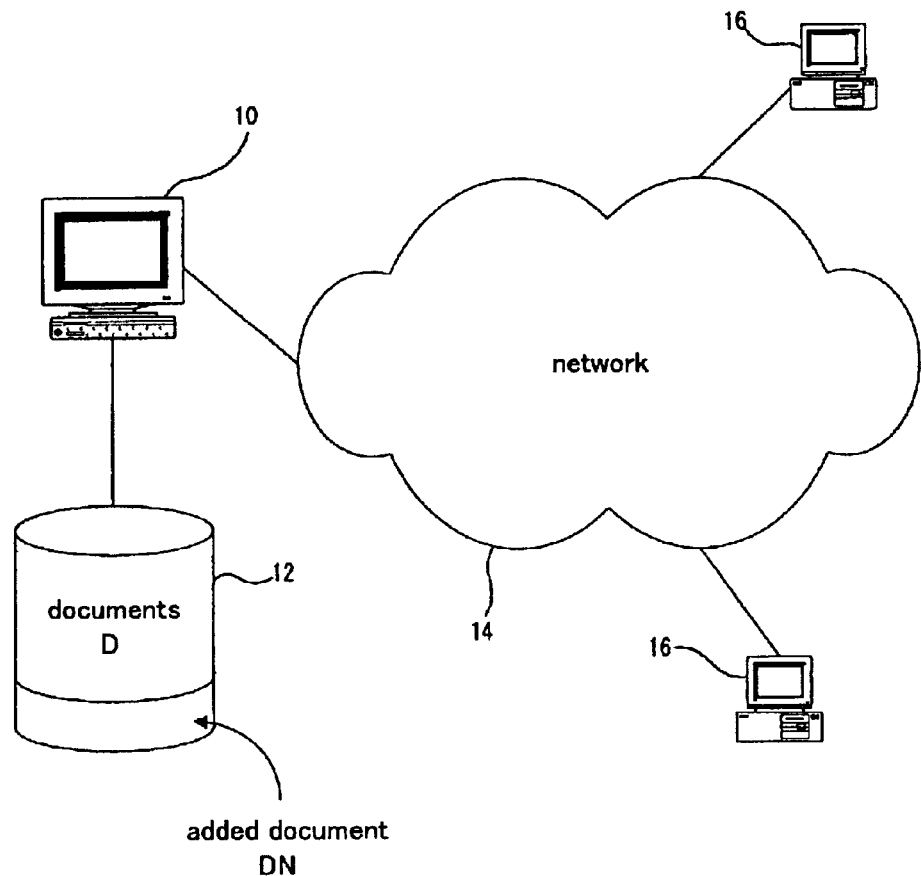
FIG. 15 is a schematic view showing an information retrieval system according to the present invention.

FIG. 15 is a schematic view showing a computer system for executing the information retrieval method according to the present invention. The computer system according to the present invention shown in FIG. 15 comprises a computer 10 and a database 12 connected to be capable of data transmission with the computer 10. Any computer such as a personal computer or a workstation may be used as the computer 10 available for the present invention so far as the same comprises hardware resources including a central processing unit (CPU) capable of executing the method according to the present invention and a memory such as a RAM. Further, any known database may be used as a database 12 available for the present invention so far as additional data may be written to the database.

The computer system shown in FIG. 15 may be configured so as to communicate with a computer 16 connected via a network 14 remotely placed using any known protocol such as TCP/IP, for example, an internet, a local area network (LAN), a wide area network (WAN). The computer system according to the embodiment shown in FIG. 15 may be configured as a so-called client-server system by using the computer 10 connected to the database 12 as a server and the computer 16 connected remotely to the server as a client computer. A user of the client computer enters an attribute, for example, a keyword to the computer 16 to retrieve desired information.

The entered keyword is transmitted to the computer 10 via the network 14 and used to execute information retrieval. An original document D is retained in the database 12. Further, a document-attribute matrix digitized using, for example, a binary model in advance after a predetermined attribute is extracted from the document D is also retained in the database 12. The above document-attribute matrix with dimensions thereof is once already reduced using a method such as the QR decomposition method or the covariance matrix method according to the present invention is provided for the actual information retrieval.

A document DN is added at any time to and accumulated as submatrices in the database 12 shown in FIG. 15. In the present invention, dimensions including prior results are efficiently reduced from the documents DN accumulated from previous execution of SVD to a specific point of time at an interval of, for example, a day unit, a week unit, a month unit or an interval specified by a server manager by using R, $SUM(M)_1$ or $SUM(M)_2$ obtained in advance by the above QR decomposition method or the covariance matrix method. The present invention makes it possible to efficiently reduce dimensions of a document-attribute matrix used for information retrieval for updated or downdated documents as described above and provides an information retrieval system with a high precision and high efficiency.

The information retrieval system is described as a client-server system in particular in FIG. 15. The present invention makes it possible to construct the information retrieval system using a standalone personal computer or a workstation in addition to a client-server system connected via a network.

The present invention will be described in particular with reference to operative examples. The present invention however is not limited to the operative examples hereinafter described.

EMBODIMENT

EXAMPLE 1

With regard to information retrieval using the QR decomposition method according to the present invention, a sample database shown in part in Table 1 is used to study an effect of the present invention. The sample database is configured as a 300×50 document keyword matrix comprising 300 documents and 50 keywords.

Since the sample database shown in Table 1 is far smaller than the database actually used, there is no great difference in a calculation speed in comparison to the known method of the prior art. Accordingly, precision of calculations of a result obtained by the method according to the present invention and a result obtained by a comparative example described later.

TABLE 1

300 50
1 1 65244e–05 7 0 19628 8 3.61624e–08 9 0.00018 10 0.01373 12 2 23141e–05
14 4.64130e–05 15 1.78852e–05 19 2 19083e–10 20 0.00028 23 1 21350e–07 24
9.98935e–10 25 7 85754e–07 28 1 00379e–05 29 2.20989e–5 39 8 26993e–08 40
3 46313e–09 42 3.42076e–10 43 1.40159e–05 45 1 12157e–06 50 5.29161e–07
5 1.95247e–05 6 9.65067e–09 11 4 55447e–07 12 0.00840 14 4.10627e–09 16
2 13934e–10 17 0.00022 22 0.04135 27 3 80890e–09 31 4.73880e–10 32
9.24676e–05 34 6 28455e–06 40 2.17201e–05 41 2.23796e–05 42 1.28397e–06 46
1.50510e–08 47 1.45181e–06 50 9 61504e–09
2 2 20380e–05 3 9.09460e–06 7 0 01776 8 0 02260 10 4.63745e–06 12 0 00147
13 0 00493 14 1 09471e–06 15 0 00366 17 1.82302e–05 18 2 04803e–05 20
2.29817e–05 22 3.91119e–09 25 3 34495e–06 26 0.02291 34 0 00014 37
7.98834e–09 39 1.33136e–07 40 5.08289e–08 41 9 11475e–09 42 3 64340e–05 43
5.91690.10 44 8 69801e–09 45 0.01932 46 1 31295e–06 47 4.29275e–08 49
1.30851e–10
4 1 62408e–07 7 4.75727e–06 8 2.24351e–05 9 4 66984e–06 10 3.25484e–06 12
2 15089e–05 14 5.29682e–06 17 1.63133e–10 26 0 00766 28 7 18088e–09 31
1 53839e–09 34 8.06182e–10 39 6 13628e–08 41 4.69203e–06 45 2 34841e–10 46
8.81336e–07 47 1.23390e–05 48 3.38329e–09 50 3 24139e–08
2 4 46380e–10 5 5.26576e–09 7 2.09751e–07 12 7 67514e–06 13 2 75356e–05 15
2.15944e–09 18 3 78191e–07 19 8 21337e–09 21 0 18159 27 1.10242e–08 28
2 09905e–05 32 1.38427e–07 34 1.04496e–06 37 2 14666e–08 38 0 00268 40
0.00482 45 6.75967e–09 46 9.43715e–07 47 1.75043e–08

.
.
.

The obtained precision of calculations is described with calculation results of Operative Example 1 and Comparative Examples 1 and 2. In addition, as a simple method to compare precision of the singular value calculations, a ratio between the maximum singular value $s_1$ and the minimum singular value $s_n$ (this value is hereinafter referred to as a conditional number and represented by c) is adopted. In addition, Comparative Example 1 shows application of the SVD method entirely to A newly specified by adding an updated submatrix Ai to a document-attribute matrix A (this method is hereinafter referred to as the "naive SVD method"). Comparative Example 2 is a method of updating SVD by the successive updating method of $A^T A$. Further, the 300 document-keyword matrices are divided into 50×50 chunks and a predetermined method used for executing the SVD for each chunk to simulate update of the database.

A personal computer using Windows™ 2000 (registered trademark of Microsoft Corporation) as an OS using Pentium™ III of a clock frequency of 733 MHz (registered trademark of Intel Corporation). Further, data is calculated using 64-bit floating-point precision.

Results obtained under the above conditions are given hereunder as condition number ratios.

The following results were obtained:

$c_1$=10732.714570223183 (Example 1)
$c_2$=10732.714570223217 (Comparative Example 1)
$c_3$=10732.714570411234 (Comparative Example 2)

Accordingly, to execute the SVD by using the QR decomposition method according to the present invention, a ratio between a result $c_2$ obtained using the naive SVD method and a method $c_1$ according to the present invention was $c_2/c_1$=1.0000000000000003. This indicates that up to nine places of decimals are identical. On the other hand, a $c_2/c_3$ ratio was 0.9999999999824819. This indicates that the precision is lower than that of the method according to the present invention. With regard to the minimum singular value $\sigma_n$, it was found out that the method according to the Example 1 and the method according to the Comparative Example 1 are identical up to 15 decimals. From the result of Example 1, the method according to the present invention has no problem in precision to approximate machine epsilon.

EXAMPLE 2

In Example 2, a scalability of data calculated in an embodiment using the QR decomposition method according to the present invention was exemplified to study a calculation speed and required amount of memory resources from the viewpoints of a total occupation time and a repetitive calculation time of the CPU. The following five matrices were used as data:

(a) 100×100
(b) 1000×100
(c) 10000×100
(d) 100000×100
(e) 1000000×100

Elements of the matrices were created as randomly generated dense matrices. A size of each chunk used for calculation was 100×100. Accordingly, when the case represented by (e), the calculation is executed while data is updated repeatedly for ten thousand times. The program which executes the method according to the present invention is mounted with a language Java™. Among memory amounts used shown in the following table, about four bytes is occupied by the virtual machine of Java™ (registered trademark of Sun Microsystems Corporation). Therefore, the essential memory size used for data may be estimated as a value obtained from subtracting 4 MB from each memory amount used shown in the following Table 4.

TABLE 2

| CPU total | (a) | (b) | (c) | (d) | (e) |
|---|---|---|---|---|---|
| Comparative Example 1 | 454 ms | 3 s and 922 ms | 92 s and 843 ms | 1040 s and 391 ms | N/A |
| Comparative Example 2 | 453 ms | 1 s and 203 ms | 8 s and 781 ms | 106 s and 969 ms | 764 s and 203 ms |
| Operative Example 2 | 578 ms | 1 s and 922 ms | 12 s and 297 ms | 126 s and 983 ms | 1291 s and 532 ms |

TABLE 3

| CPU/ repeating | (a) | (b) | (c) | (d) | (e) |
|---|---|---|---|---|---|
| Comparative Example 1 | 454 ms | 3 s and 922 ms | 92 s and 843 ms | 1040 s and 391 ms | N/A |
| Comparative Example 2 | 453 ms | 120.3 ms | 87.8 ms | 106.9 ms | 76.4 ms |
| Operative Example 2 | 578 ms | 192.2 ms | 122.9 ms | 126.9 ms | 129.1 ms |

TABLE 4

| Memory amount used | (a) | (b) | (c) | (d) | (e) |
|---|---|---|---|---|---|
| Comparative Example 1 | 5.9 MB | 8.4 MB | 31.0 MB | 251.6 MB | Unassignable |
| Comparative Example 2 | 6.5 MB | 6.5 MB | 6.5 MB | 6.5 MB | 6.5 MB |
| Operative Example 2 | 6.5 MB | 6.5 MB | 6.5 MB | 6.5 MB | 6.5 MB |

With regard to the calculation time, obtaining a singular value by repeating $A^T A$ shown in Comparative Example 2 gives the fastest result. This fact is also clear logically that only calculations of matrix-matrix product and matrix-matrix sum are required in the calculations of $A^T A$ in Comparative Example 2.

On the other hand, with regard to a time of each repetitive calculation, the method according to the present invention shown in Operative Example 2 requires a longer repeating time because of time needed for the QR decomposition. Precisely, when a chunk size is set to H for the dense matrix used in Operative Example 2, a calculation amount of $0(HN^2)$ is required for multiplication in Comparative Example 2. On the other hand, the QR decomposition method used in Operative Example 2 requires a calculation amount of $0(2HN^2)$ for one-time calculation (Golub & Van Loan).

However, as described in Operative Example 1, the repetitive calculation of $A^T A$ in Comparative Example 2 has a preference to a speed and sacrifices an error. In addition, when data is 100×100 (in the case of the matrix (a) described above), there is no repetition and the data therefore shows a difference of times required for calculation means. A CPU time required for one-time repetition is approximately 100 ms in Comparative Example 2 or approximately 130 ms in Operative Example 2. However, it can be known that the method according to the present invention realizes much faster calculation time in comparison to the naive SVD in Comparative Example 1.

With regard to memory amounts used shown in Table 4, both methods in Comparative Example 2 and Operative Example 2 require almost the same memory amounts which are smaller than the memory amount used in Comparative Example 1. Accordingly, the method according to the present invention is not inferior to the conventional method even in respect to memory resource consumption.

EXAMPLE 3

Update Example

Figure 16:
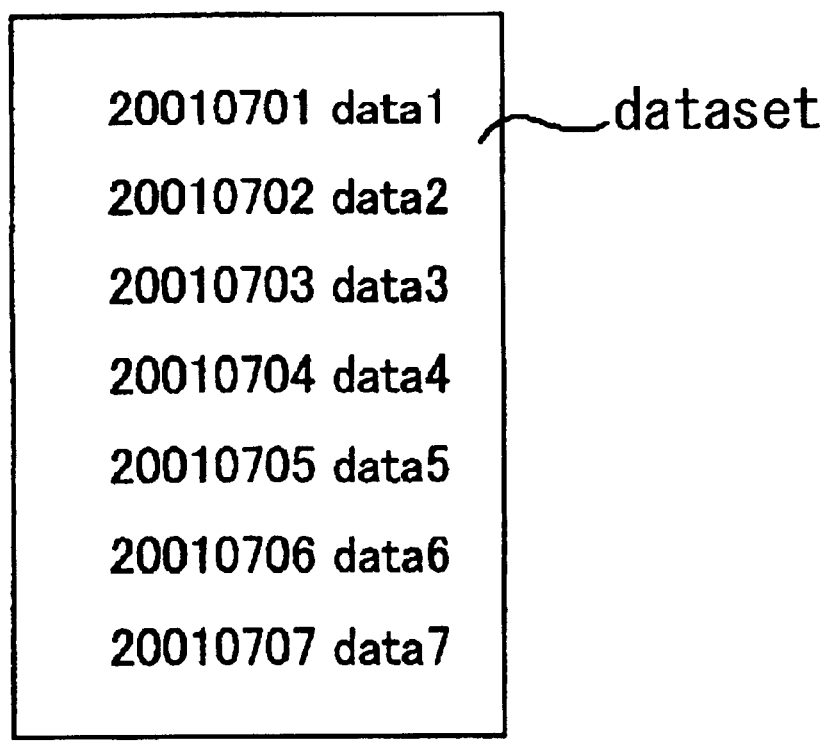
FIG. 16 is a view showing an example of data comprising time stamps and data file mates.

As Operative Example 3, the case of using a covariance matrix to update documents in the present invention was studied. In Operative Example 3, the seven data files (containing keywords and appearance frequencies thereof)

shown in FIG. 16 are assumed to be provided in a time sequence. FIG. 16 shows examples of data files wherein time stamps and data file names are stored. In this operative example, a data file refers to as a file named "dataset". For example, 20010701 shown in FIG. 16 is a time stamp representing Jul. 1, 2001.

The contents of files shown in FIG. 16 are shown in FIGS. 17 to 23. In each file, keywords used as attributes and weights thereof (a weight is a positive real value; larger the weight, the same contributes more to containing of a corresponding keyword in a corresponding document) are paired. Further, the document data files shown in FIGS. 17 to 23 were each configured as 20 documents in a described embodiment.

When the above data was provided, the same was read sequentially from data 1 containing a time stamp and then the covariance matrix method according to the present invention was applied sequentially to data up to data 7 shown in FIG. 23. Finally, the SVD was executed using a covariance matrix to obtain singular values and eigenvectors after data 7 was processed. Results of the singular values and the eigenvectors were compared to those obtained by providing the data files each comprising 140 documents shown in Tables 5 to 10 from the first time, generating a covariance matrix therefrom, and then executing the SVD (the order of vectors was omitted).

In addition, 140 40 in the first line of Table 5 indicates that the data file comprises 140 documents in total and 40 keywords. FIG. 24 shows the keywords used in Operative Example 3 of the present invention.

TABLE 5

| | |
|---|---|
| 1$^{st}$ line | 140 40 |
| 2$^{nd}$ line | 1 1.0 2 1.0 4 0.4 |
| 3$^{rd}$ line | 1 1.0 2 1.0 5 0.3 |
| 4$^{th}$ line | 1 1.0 2 1.0 6 0.1 |
| 5$^{th}$ line | 1 1.0 2 1.0 4 0.3 |
| 6$^{th}$ line | 1 1.0 2 1.0 6 0.2 |
| 7$^{th}$ line | 1 1.0 2 1.0 4 0.2 |
| 8$^{th}$ line | 1 1.0 2 1.0 6 0.3 |
| 9$^{th}$ line | 1 1.0 2 1.0 4 0.1 |
| 10$^{th}$ line | 1 1.0 2 1.0 6 0.4 |
| 11$^{th}$ line | 1 1.0 2 1.0 |
| 12$^{th}$ line | 1 1.0 2 1.0 3 0.5 5 0.3 |
| 13$^{th}$ line | 1 1.0 2 1.0 3 0.5 4 0.4 |
| 14$^{th}$ line | 1 1.0 2 1.0 3 0.5 6 0.1 |
| 15$^{th}$ line | 1 1.0 2 1.0 3 0.5 |
| 16$^{th}$ line | 1 1.0 2 1.0 3 0.5 5 0.3 |
| 17$^{th}$ line | 1 1.0 2 0.5 3 1.0 4 0.1 |
| 18$^{th}$ line | 1 1.0 2 0.5 3 1.0 4 0.4 |
| 19$^{th}$ line | 1 1.0 2 0.5 3 1.0 6 0.1 |
| 20$^{th}$ line | 1 1.0 2 0.5 3 1.0 |
| 21$^{st}$ line | 1 1.0 2 0.5 3 1.0 5 0.3 6 0.2 |
| 22$^{nd}$ line | 1 1.0 3 1.0 6 0.1 |
| 23$^{rd}$ line | 1 1.0 3 1.0 4 0.2 |
| 24$^{th}$ line | 1 1.0 3 1.0 |
| 25$^{th}$ line | 1 1.0 3 1.0 5 0.3 |
| 26$^{th}$ line | 1 1.0 3 1.0 4 0.4 |
| 27$^{th}$ line | 7 1.0 9 1.0 10 0.1 11 0.4 |

TABLE 6

| | |
|---|---|
| 28$^{th}$ line | 7 1.0 9 1.0 11 0.3 |
| 29$^{th}$ line | 7 1.0 9 1.0 10 0.2 |
| 30$^{th}$ line | 7 1.0 9 1.0 |
| 31$^{st}$ line | 7 1.0 9 1.0 10 0.1 |
| 32$^{nd}$ line | 7 1.0 9 1.0 11 0.2 |
| 33$^{rd}$ line | 7 1.0 9 1.0 10 0.3 |
| 34$^{th}$ line | 7 1.0 9 1.0 11 0.4 |
| 35$^{th}$ line | 7 1.0 9 1.0 11 0.1 |

TABLE 6-continued

| | |
|---|---|
| 36$^{th}$ line | 7 1.0 9 1.0 10 0.1 |
| 37$^{th}$ line | 7 1.0 8 0.5 9 1.0 11 0.2 |
| 38$^{th}$ line | 7 1.0 8 0.5 9 1.0 10 0.3 |
| 39$^{th}$ line | 7 1.0 8 0.5 9 1.0 10 0.2 |
| 40$^{th}$ line | 7 1.0 8 0.5 9 1.0 11 0.1 |
| 41$^{st}$ line | 7 1.0 8 0.5 9 1.0 |
| 42$^{nd}$ line | 7 1.0 8 1.0 9 0.5 10 0.1 |
| 43$^{rd}$ line | 7 1.0 8 1.0 9 0.5 11 0.3 |
| 44$^{th}$ line | 7 1.0 8 1.0 9 0.5 11 0.2 |
| 45$^{th}$ line | 7 1.0 8 1.0 9 0.5 11 0.1 |
| 46$^{th}$ line | 7 1.0 8 1.0 10 0.1 |
| 47$^{th}$ line | 7 1.0 8 1.0 10 0.1 |
| 48$^{th}$ line | 7 1.0 8 1.0 |
| 49$^{th}$ line | 7 1.0 8 1.0 11 0.3 |
| 50$^{th}$ line | 7 1.0 8 1.0 10 0.2 |
| 51$^{st}$ line | 7 1.0 8 1.0 11 0.1 |
| 52$^{nd}$ line | 12 1.0 18 0.1 |
| 53$^{rd}$ line | 12 1.0 21 0.1 |

TABLE 7

| | |
|---|---|
| 54$^{th}$ line | 12 1.0 24 0.1 |
| 55$^{th}$ line | 12 1.0 35 0.1 |
| 56$^{th}$ line | 12 1.0 |
| 57$^{th}$ line | 13 1.0 19 0.1 |
| 58$^{th}$ line | 13 1.0 22 0.1 |
| 59$^{th}$ line | 13 1.0 28 0.1 |
| 60$^{th}$ line | 13 1.0 33 0.1 |
| 61$^{st}$ line | 13 1.0 |
| 62$^{nd}$ line | 14 1.0 16 0.1 |
| 63$^{rd}$ line | 14 1.0 23 0.1 |
| 64$^{th}$ line | 14 1.0 29 0.1 |
| 65$^{th}$ line | 14 1.0 37 0.1 |
| 66$^{th}$ line | 14 1.0 |
| 67$^{th}$ line | 15 1.0 17 0.1 |
| 68$^{th}$ line | 15 1.0 25 0.1 |
| 69$^{th}$ line | 15 1.0 30 0.1 |
| 70$^{th}$ line | 15 1.0 38 0.1 |
| 71$^{st}$ line | 15 1.0 |
| 72$^{nd}$ line | 21 0.3 29 0.4 33 0.2 37 1.0 |
| 73$^{rd}$ line | 19 0.2 28 0.3 29 0.2 33 0.3 36 0.2 38 1.0 |
| 74$^{th}$ line | 20 0.2 32 0.2 35 0.2 39 1.0 |
| 75$^{th}$ line | 16 0.3 22 0.4 23 0.2 26 0.1 28 0.3 40 1.0 |
| 76$^{th}$ line | 16 1.0 18 0.2 40 0.3 |
| 77$^{th}$ line | 17 1.0 26 0.2 27 0.4 40 0.1 |
| 78$^{th}$ line | 16 0.2 18 1.0 22 0.3 23 0.4 24 0.2 27 0.2 29 0.4 34 0.3 36 0.2 |
| 79$^{th}$ line | 19 1.0 22 0.1 25 0.3 29 0.4 33 0.3 34 0.4 35 0.4 |

TABLE 8

| | |
|---|---|
| 180$^{th}$ line | 20 1.0 22 0.1 24 0.3 25 0.3 |
| 81$^{st}$ line | 21 1.0 29 0.3 33 0.2 35 0.2 36 0.2 |
| 82$^{nd}$ line | 22 1.0 26 0.4 34 0.4 35 0.2 |
| 83$^{rd}$ line | 23 1.0 30 0.3 37 0.3 |
| 84$^{th}$ line | 20 0.3 24 1.0 |
| 85$^{th}$ line | 22 0.3 25 1.0 30 0.2 38 0.4 |
| 86$^{th}$ line | 22 0.1 26 1.0 29 0.2 31 0.2 34 0.3 36 0.3 |
| 87$^{th}$ line | 18 0.2 25 0.3 26 0.1 27 1.0 34 0.3 35 0.3 |
| 88$^{th}$ line | 27 0.2 28 1.0 |
| 89$^{th}$ line | 17 0.3 23 0.4 29 1.0 37 0.4 40 0.4 |
| 90$^{th}$ line | 18 0.4 24 0.3 27 0.3 29 0.3 30 1.0 37 0.2 |
| 91$^{st}$ line | 16 0.3 17 02. 25 0.3 27 0.3 29 0.2 31 1.0 33 0.3 35 0.3 |
| 92$^{nd}$ line | 20 0.2 25 0.1 30 0.3 32 1.0 36 0.4 |
| 93$^{rd}$ line | 19 0.2 20 0.3 26 0.4 28 0.2 33 1.0 35 0.4 |
| 94$^{th}$ line | 17 0.3 34 1.0 |
| 95$^{th}$ line | 21 0.4 30 0.3 34 0.3 35 1.0 38 0.4 |
| 96$^{th}$ line | 17 0.4 20 0.4 21 0.3 23 0.4 27 0.4 36 1.0 |
| 97$^{th}$ line | 18 0.3 22 0.2 29 0.2 37 1.0 39 0.2 |
| 98$^{th}$ line | 18 0.2 23 0.3 24 0.3 29 0.2 32 0.3 36 0.2 38 1.0 |
| 99$^{th}$ line | 18 0.2 28 0.3 39 1.0 |
| 100$^{th}$ line | 40 1.0 |
| 101$^{st}$ line | 16 1.0 18 0.3 20 0.2 26 0.3 30 0.3 37 0.3 39 0.3 |
| 102$^{nd}$ line | 17 1.0 20 0.4 24 0.2 26 0.2 27 0.2 30 0.4 36 0.4 38 0.4 |
| 103$^{rd}$ line | 18 1.0 19 0.3 30 0.2 |

TABLE 8-continued

| | |
|---|---|
| 104th line | 19 1.0 25 0.2 31 0.3 33 0.3 36 0.4 |
| 105th line | 18 0.2 20 1.0 22 0.4 23 0.3 33 0.3 37 0.4 38 0.4 40 0.2 |

TABLE 9

| | |
|---|---|
| 106th line | 19 0.2 21 1.0 22 0.2 25 0.1 37 0.2 |
| 107th line | 22 1.0 28 0.2 32 0.4 37 0.4 |
| 108th line | 21 0.3 23 1.0 34 0.3 40 0.2 |
| 109th line | 24 1.0 |
| 110th line | 19 0.3 24 0.1 25 1.0 27 0.4 30 0.3 |
| 111th line | 20 0.4 26 1.0 28 0.4 30 0.4 35 0.2 |
| 112th line | 24 0.3 25 0.1 27 1.0 29 0.3 |
| 113th line | 26 0.3 28 1.0 30 0.3 35 0.4 40 0.4 |
| 114th line | 16 0.4 20 0.4 25 0.3 29 1.0 32 0.2 33 0.1 35 0.4 |
| 115th line | 23 0.4 30 1.0 35 0.3 |
| 116th line | 31 1.0 34 0.4 |
| 117th line | 26 0.3 32 1.0 39 0.4 |
| 118th line | 33 1.0 35 0.2 36 0.2 37 0.2 38 0.2 |
| 119th line | 17 0.2 22 0.2 27 0.2 31 0.2 34 1.0 |
| 120th line | 18 0.2 35 1.0 |
| 121st line | 28 0.1 33 0.3 35 0.2 36 1.0 38 0.3 |
| 122nd line | 37 1.0 |
| 123rd line | 18 0.4 19 0.2 20 0.3 22 0.3 23 0.3 38 1.0 39 0.3 |
| 124th line | 20 0.3 29 0.2 34 0.2 39 1.0 |
| 125th line | 16 0.3 17 0.3 23 0.3 25 0.4 33 0.4 34 0.3 36 0.237 0.4 39 0.1 40 1.0 |
| 126th line | 16 1.0 17 0.4 19 0.2 24 0.3 27 0.2 31 0.1 32 0.1 36 0.3 39 0.1 |
| 127th line | 17 1.0 23 0.2 26 0.4 28 0.2 39 0.3 |
| 128th line | 18 1.0 27 0.2 33 0.3 35 0.2 |
| 129th line | 19 1.0 24 0.2 26 0.2 30 0.1 33 0.2 |
| 130th line | 20 1.0 21 0.2 31 0.2 33 0.2 |
| 131st line | 21 1.0 36 0.2 37 0.3 |

TABLE 10

| | |
|---|---|
| 132nd line | 16 0.4 22 1.0 30 0.3 32 0.3 35 0.2 37 0.4 |
| 133rd line | 23 1.0 28 0.3 30 0.3 33 0.3 40 0.2 |
| 134th line | 24 1.0 33 0.4 35 0.2 38 0.4 |
| 135th line | 23 0.3 25 1.0 35 0.2 38 0.4 39 0.2 40 0.4 |
| 136th line | 17 0.2 18 0.3 22 0.3 24 0.2 26 1.0 38 0.4 |
| 137th line | 16 0.3 18 0.1 21 0.2 25 0.3 27 1.0 36 0.2 |
| 138th line | 23 0.2 26 0.2 28 1.0 |
| 139th line | 29 1.0 31 0.4 38 0.3 40 0.4 |
| 140th line | 18 0.1 26 0.2 38 0.3 29 0.3 30 1.0 33 0.2 35 0.1 |
| 141st line | 24 0.1 26 0.2 31 1.0 |

Figure 25:
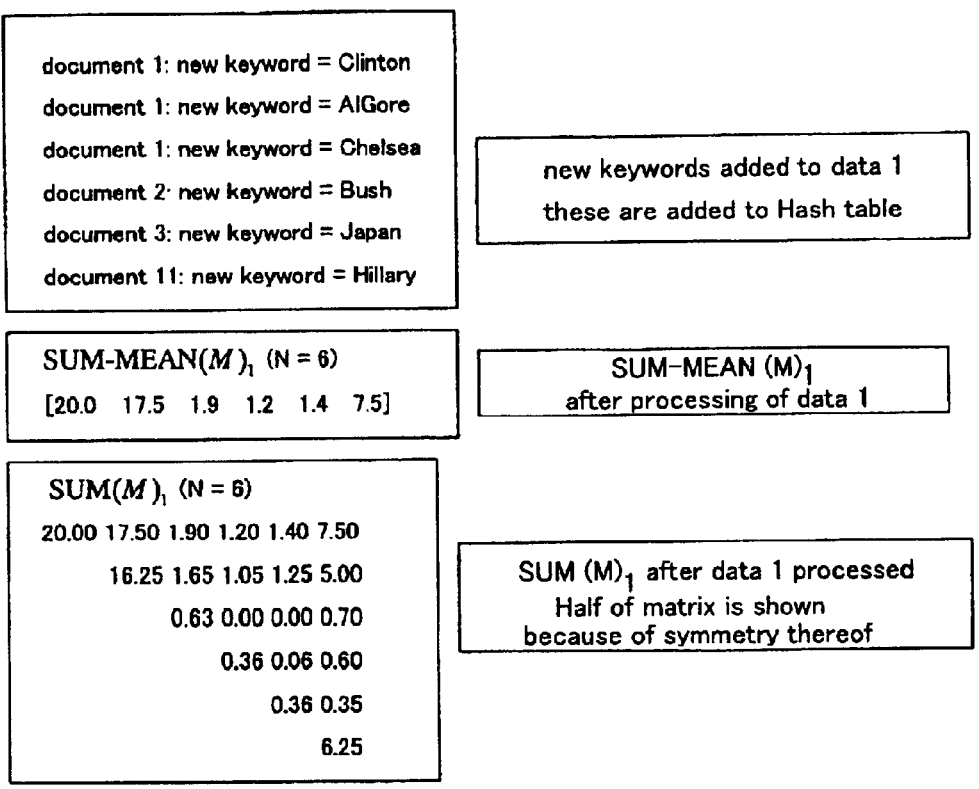
FIG. 25 is a view showing SUM-MEAN(M)$_1$ and SUM(M)$_1$ at the stage where only data1 has been processed.

In Example 3, data1 shown in FIG. 17 was assumed to be entered first. FIG. 25 shows SUM-MEAN$(M)_1$ and SUM$(M)_1$ at the time when only data1 is processed. In addition, the first six lines indicate numbers of documents whose new keywords were found and keyword names thereof. As shown in FIG. 25, the total number of keywords is six at the time when data1 is processed. Therefore, SUM-MEAN$(M)_1$ represents a six-dimension vector and SUM$(M)_1$ represents a symmetric matrix having 6×6 dimensions.

Figure 27:
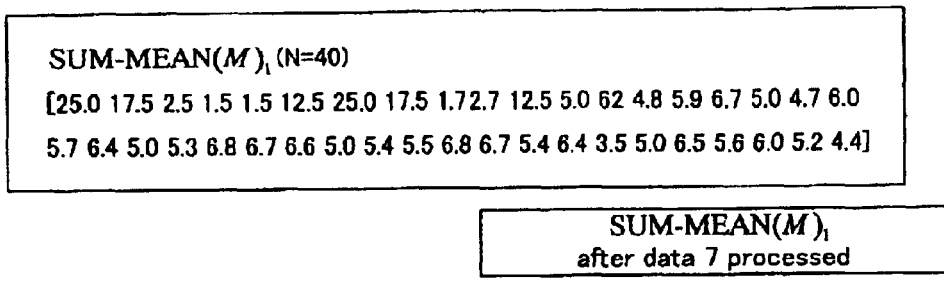
FIG. 27 is a view showing SUM-MEAN(M)$_1$ obtained by updating data up to data7.

FIG. 25 shows only half the elements written since the matrix is symmetric. Further, each time a keyword is found, the same is added to the keyword hash table managing keywords. In addition, the keyword hash table also retains counts each indicating how many documents contains a specific keyword. In Operative Example 3, the total number of documents M=20 and the total number of keywords N=6 are retained in addition to the keyword hash table. Thereafter, a document was added by updating data2. FIG. 26 shows the result. In addition, an order and a structure of data shown in FIG. 26 are the same as those of the data shown in FIG. 25. Data from data3 to data6 were processed in the same manner. Finally, data7 was updated. FIG. 27 shows SUM-MEAN$(M)_1$ after this processing. Further, Tables 11 and 12 show the contents of SUM$(M)_1$. In addition, since 40 keywords in total were all used in updating data3 to data6, a new keyword was not added in processing of data7. In addition, elements represented by asterisks (*) in Tables 11 and 12 are 0.0. Further, digits on the left side of a row represent column number of a matrix.

TABLE 11

1: 25 17.5 2.5 1.5 1.5 12.5 ********************************
2: 16.25 1.65 1.05 1.25 5.0 ********************************
3: 0.83  1.30 ******************************
4: 0.45 0.06 0.90 ********************************
5: 0.37 0.45 ********************************
6: 11.25 ********************************
7: 25.00 17.50 1.70 2.70 12.50 ********************************
8: 16.25 1.35 2.00 5.00 ********************************
9: 0.35 0.04 0.65 ********************************
10: 0.75 1.15 ********************************
11: 11.25 ********************************
12: 5.00 0.10 0.10 0.10 0.10 ********************************
13: 3.86 0 02 0.44 0.47 * 0.38 0.65 0.09 0 38 * 0.73 0.64 0.65 0.55 * 0.06
0.09 0.79 0.80 0.26 0.38 0.06 0.47 0.43 0.10 0.82 0.36 *
14: 3.52 * 0.60 * 0.20 0.20 * 0.30 * 0.06 0.42 0.42 0.80 * 0.12 0.16 0.12 0.16 0.74 0.32 *** 0.06 0.32 0.21 0 04
15: 3.73 0.32 * 0.29 0.15 * 0.47 * 0.46 0 17 0.62 0.06 * 0.36 0.22 0.43 0.86 0.27 0.80 0.18 0.03 0.30 * 0.57 0.06 0.13
16: 3.33 * 0.48 0 44 0 61 1 11 * 0 33 0.18 0.71 0.12 * 0.06 0 50 0.96 0 66 0 28 0.40 0.18 0.24 0.61 0.24 0.43 0.63 0.30
17: 5.00 0.10 0.10 0.10 0.10 ********************************
18: 3.39 0.2 0 10 1.06 * 0.2 0.06 0.44 0.04 * 0 08 0 82 0 25 0.4 0.5 0.12 0.02 0.08 0 28 * 0 16 0.4 0.32
19: 3 84 0.32 0 15 * 0 58 0.41 0.22 1.2 * 0.1 0.38 0.36 0.7 0.09 0.59 0.7 0.13 0 84 0.48 0.1 0.76 0.06
20: 3.75 0.47 * 0.09 0.60 0.15 0.08 * 0.20 * 0.85 0.33 0.16 0.22 0.08 0.36 1.15 0.76 0.20 **
21: 3.26 * 0.25 0.51 0.54 0.68 * 0.18 0.40 0.31 0.87 0 80 0.84 0.02 0.08 0.48 0.52 0.15 0.24

TABLE 12

0.43
22: 5.00 0.10 0.10 0.10 0.10 **************
23: 3.73 0.23 0.54 0.58 * 0.55 0.30 0.42 * 0.46 0.36 0.30 0.46 0.33 0.90 0.63 0.15 0.40
24: 4.22 0.62 0.70 * 0.57 0.42 1.00 0.84 0.60 0.55 0.09 0.27 0.14 1.24 0.24 0.51 *
25: 4.09 1.06 * 0.34 0.21 0.60 0.70 0.28 0.46 0.26 0.24 0.26 0.80 0.53 0.38 0.64
26: 4.20 * 0.24 0.18 0.50 0.20 0.18 0.46 0.28 0.37 0.09 0.64 0.06 0.12 *
27: 5.00 0.10 0.10 0.10 0.10 *********
28: 3.72 0.18 0.40 0.48 0.98 0.56 0.04 0.40 1 00 0.52 0.94 0.59 0.28
29: 3.69 0.53 0.80 0.26 0.32 0.10 0.28 0.03 0.80 1.19 0.33 0.36
30: 4.14 0.36 0.28 0.44 0.39 0.09 0.88 0.18 0.50 0.09 *
31: 4.35 0.90 0.86 0.30 0.38 0.48 0.36 0.08 0.12 0.12
32: 2.98 0.64 0.49 0.07 0.38 0.20 0.78 0.21 0.21
33: 4.12 0.32 0.65 0.66 0.20 0.24 0.06 0.20
34: 2.43 0.61 0.30 * 0.02 * 0.01
35: 3.56 0.33 0.28 0.02 0.26 0.01
36: 4.01 0.24 0.22 0.49 0.40
37: 3.86 0.04 0.36 0.16
38: 3.90 0.56 0.36
39: 3.06 0.66
40: 3.38

In the present invention, a covariance matrix is used to end updating data from data1 to data7 as described above. Further in the present invention, when a user requests to create a covariance matrix at this time, SUM$(M)_2$ is calculated from the following formula. SUM$(M)_2$ represents a symmetric matrix of 40×40.

$$SUM(M)_2 = {}^{bar}d(M){}^{bar}d(M)^T \qquad \text{[Formula 15]}$$

Thereafter, a computer is made to calculate covariance matrix from SUM$(M)_1$ and SUM$(M)_2$. Tables 13 to 19 show results of the covariance matrix obtained as above described. Since the obtained covariance matrix is a symmetric matrix, Tables 13 to 19 show only a half of elements.

TABLE 13 covariance matrix C

[1st line]

| | | | | | | | | |
|---|---|---|---|---|---|---|---|---|
| 1.5e−01 | 1.0e−01 | 1.5e−02 | 8.8e−03 | 8.8e−03 | 7.3e−02 | −3.2e−02 | −2.2e−02 | −2.2e−03 |
| −3.4e−03 | −1.6e−02 | −6.4e−03 | −7.9e−03 | −6.1e−03 | −7.5e−03 | −8.5e−03 | −6.4e−03 | −6.0e−03 |
| −7.7e−03 | −7.3e−03 | −8.2e−03 | −6.4e−03 | −6.8e−03 | −8.7e−03 | −8.5e−03 | −8.4e−03 | −6.4e−03 |
| −6.9e−03 | −7.0e−03 | −8.7e−03 | −8.5e−03 | −6.9e−03 | −8.2e−03 | −4.5e−03 | −6.4e−03 | −8.3e−03 |
| −7.1e−03 | −7.7e−03 | −6.6e−03 | −5.6e−03 | | | | | |

[2nd line]

| | | | | | | | | |
|---|---|---|---|---|---|---|---|---|
| 1.0e−01 | 9.6e−03 | 6.2e−03 | 7.6e−03 | 2.5e−02 | −2.2e−02 | −1.6e−02 | −1.5e−03 | −2.4e−03 |
| −1.1e−02 | −4.5e−03 | −5.5e−03 | −4.3e−03 | −5.3e−03 | −6.0e−03 | −4.5e−03 | −4.2e−03 | −5.4e−03 |
| −5.1e−03 | −5.7e−03 | −4.5e−03 | −4.7e−03 | −6.1e−03 | −6.0e−03 | −5.9e−03 | −4.5e−03 | −4.8e−03 |
| −4.9e−03 | −6.1e−03 | −6.0e−03 | −4.8e−03 | −5.7e−03 | −3.1e−03 | −4.5e−03 | −5.8e−03 | −5.0e−03 |
| −5.4e−03 | −4.6e−03 | −3.9e−03 | | | | | | |

[3rd line]

| | | | | | | | | |
|---|---|---|---|---|---|---|---|---|
| 5.6e−03 | −1.9e−04 | −1.9e−04 | 7.7e−03 | −3.2e−03 | −2.2e−03 | −2.2e−04 | −3.4e−04 | −1.6e−03 |
| −6.4e−04 | −7.9e−04 | −6.1e−04 | −7.5e−04 | −8.5e−04 | −6.4e−04 | −6.0e−04 | −7.7e−04 | −7.3e−04 |
| −8.2e−04 | −6.4e−04 | −6.8e−04 | −8.7e−04 | −8.5e−04 | −8.4e−04 | −6.4e−04 | −6.9e−04 | −7.0e−04 |
| −8.7e−04 | −8.5e−04 | −6.9e−04 | −8.2e−04 | −4.5e−04 | −6.4e−04 | −8.3e−04 | −7.1e−04 | −7.7e−04 |
| −6.6e−04 | −5.6e−04 | | | | | | | |

[4th line]

| | | | | | | | | |
|---|---|---|---|---|---|---|---|---|
| 3 1e−03 | 3.1e−04 | 5.5e−03 | −1.9e−03 | −1.3e−03 | −1.3e−04 | −2.1e−04 | −9.6e−04 | −3.8e−04 |
| −4.7e−04 | −3.7e−04 | −4 5e−04 | −5.1e−04 | −3.8e−04 | −3.6e−04 | −4.6e−04 | −4.4e−04 | −4.9e−04 |
| −3.8e−04 | −4.1e−04 | −5.2e−04 | −5.1e−04 | −5.1e−04 | −3.8e−04 | −4.1e−04 | −4.2e−04 | −5.2e−04 |
| −5.1e−04 | −4.1e−04 | −4.9e−04 | −2.7e−04 | −3.8e−04 | −5.0e−04 | −4.3e−04 | −4.6e−04 | −4.0e−04 |
| −3.4e−04 | | | | | | | | |

TABLE 14 covariance matric C (continued)

[5th line]

| | | | | | | | | |
|---|---|---|---|---|---|---|---|---|
| 2.5e−03 | 2.3e−03 | −1.9e−03 | −1.3e−03 | −1.3e−04 | −2.1e−04 | −9.6e−04 | −3.8e−04 | −4.7e−04 |
| −3.7e−04 | −4.5e−04 | −5.1e−04 | −3.8e−04 | −3.6e−04 | −4.6e−04 | −4.4e−04 | −4.9e−04 | −3.8e−04 |
| −4.1e−04 | −5.2e−04 | −5.1e−04 | −5.1e−04 | −3.8e−04 | −4.1e−04 | −4.2e−04 | −5.2e−04 | −5.1e−04 |
| −4.1e−04 | −4.9e−04 | −2.7e−04 | −3.8e−04 | −5.0e−04 | −4.3e−04 | −4.6e−04 | −4.0e−04 | −3.4e−04 |

[6th line]

| | | | | | | | | |
|---|---|---|---|---|---|---|---|---|
| 7.2e−02 | −1.6e−02 | −1.1e−02 | −1.1e−03 | −1.7e−03 | −8.0e−03 | −3.2e−03 | −4.0e−03 | −3.1e−03 |
| −3.8e−03 | −4.3e−03 | −3.2e−03 | −3.0e−03 | −3.8e−03 | −3.6e−03 | −4.1e−03 | −3.2e−03 | −3.4e−03 |
| −4.3e−03 | −4.3e−03 | −4.2e−03 | −3.2e−03 | −3.4e−03 | −3.5e−03 | −4.3e−03 | −4.3e−03 | −3.4e−03 |
| −4.1e−03 | −2.2e−03 | −3.2e−03 | −4.1e−03 | −3.6e−03 | −3.8e−03 | −3.3e−03 | −2.8e−03 | |

[7th line]

| | | | | | | | | |
|---|---|---|---|---|---|---|---|---|
| 1.5e−01 | 1. e−01 | 1. e−02 | 1.6e−02 | 7.3e−02 | −6.4e−03 | −7.9e−03 | −6.1e−03 | −7.5e−03 |
| −8.5e−03 | −6.4e−03 | −6.0e−03 | −7.7e−03 | −7.3e−03 | −8.2e−03 | −6.4e−03 | −6.8e−03 | −8.7e−03 |
| −8.5e−03 | −8.4e−03 | −6.4e−03 | −6.9e−03 | −7.0e−03 | −8.7e−03 | −8.5e−03 | −6.9e−03 | −8.2e−03 |
| −4.5e−03 | −6.4e−03 | −8.3e−03 | −7.1e−03 | −7.7e−03 | −6 6e−03 | −5.6e−03 | | |

[8th line]

| | | | | | | | | |
|---|---|---|---|---|---|---|---|---|
| 1.0e−01 | 8.1e−03 | 1.2e−02 | 2.5e−02 | −4.5e−03 | −5.5e−03 | −4 3e−03 | −5.3e−03 | −6.0e−03 |
| −4.5e−03 | −4.2e−03 | −5.4e−03 | −5.1e−03 | −5.7e−03 | −4.5e−03 | −4.7e−03 | −6.1e−03 | −6.0e−03 |
| −5.9e−03 | −4.5e−03 | −4.8e−03 | −4.9e−03 | −6.1e−03 | −6 0e−03 | −4.8e−03 | −5.7e−03 | −3.1e−03 |
| −4.5e−03 | −5.8e−03 | −5.0e−03 | −5.4e−03 | −4.6e−03 | −3.9e−03 | | | |

[9th line]

| | | | | | | | | |
|---|---|---|---|---|---|---|---|---|
| 2.4e−03 | 5.2e−05 | 3.6e−03 | −4.3e−04 | −5.4e−04 | −4.2e−04 | −5.1e−04 | −5.8e−04 | −4.3e−04 |
| −4.1e−04 | −5.2e−04 | −4.9e−04 | −5.6e−04 | −4.3e−04 | −4.6e−04 | 5.9e−04 | −5.8e−04 | −5.7e−04 |
| −4.3e−04 | −4 7e−04 | −4 8e−04 | −5.9e−04 | −5.8e−04 | −4.7e−04 | −5.6e−04 | −3.0e−04 | −4.3e−04 |
| −5.6e−04 | −4.9e−04 | −5.2e−04 | −4.5e−04 | −3.8e−04 | | | | |

TABLE 15 covariance matrix C (continued)

[10th line]

| | | | | | | | | |
|---|---|---|---|---|---|---|---|---|
| 5.0e−03 | 6.5e−03 | −6.9e−04 | −8.5e−04 | −6.6e−04 | −8.1e−04 | −9.2e−04 | −6.9e−04 | −6.5e−04 |
| −8.3e−04 | −7.9e−04 | −8.8e−04 | −6.9e−04 | −7.3e−04 | −9.4e−04 | −9.2e−04 | −9.1e−04 | −6.9e−04 |
| −7.4e−04 | −7.6e−04 | −9.4e−04 | −9.2e−04 | −7.4e−04 | −8.8e−04 | −4.8e−04 | −6.9e−04 | −9.0e−04 |
| −7.7e−04 | −8.3e−04 | −7.2e−04 | −6.1e−04 | | | | | |

[11th line]

| | | | | | | | | |
|---|---|---|---|---|---|---|---|---|
| 7.2e−02 | −3.2e−03 | −4 0e−03 | −3.1e−03 | −3.8e−03 | −4.3e−03 | −3.2e−03 | −3.0e−03 | −3.8e−03 |
| −3.6e−03 | −4.1e−03 | −3.2e−03 | −3.4e−03 | −4.3e−03 | −4.3e−03 | −4.2e−03 | −3.2e−03 | −3.4e−03 |
| −3.5e−03 | −4.3e−03 | −4.3e−03 | −3.4e−03 | −4.1e−03 | −2.2e−03 | −3.2e−03 | −4.1e−03 | −3.6e−03 |
| −3.8e−03 | −3.3e−03 | −2.8e−03 | | | | | | |

[12th line]

| | | | | | | | | |
|---|---|---|---|---|---|---|---|---|
| 3.4e−02 | −8.7e−04 | −5.1e−04 | −7.9e−04 | −9.9e−04 | −1.3e−03 | −1.2e−03 | −1.5e−03 | −1.5e−03 |
| −1.6e−03 | −1.3e−03 | −1.4e−03 | −1.7e−03 | −1.7e−03 | −1.7e−03 | −1.3e−03 | −1.4e−03 | −1.4e−03 |
| −1.7e−03 | −1.7e−03 | −1.4e−03 | −1.6e−03 | −8.9e−04 | −1.3e−03 | −1.7e−03 | −1.4e−03 | −1.5e−03 |
| −1.3e−03 | −1.1e−03 | | | | | | | |

[13th line]

| | | | | | | | | |
|---|---|---|---|---|---|---|---|---|
| 2.6e−02 | −1.4e−03 | 1.3e−03 | 1.2e−03 | −1.6e−03 | 1.2e−03 | 2.7e−03 | −1.2e−03 | 6.9e−04 |
| −1.6e−03 | 3.5e−03 | 2.4e−03 | 2.5e−03 | 1.8e−03 | −1.6e−03 | −1.3e−03 | −1.1e−03 | 3.5e−03 |
| 3.6e−03 | 1.5e−04 | 6.9e−04 | −6.8e−04 | 1.8e−03 | 1.0e−03 | −1.1e−03 | 4.0e−03 | 9.3e−04 |
| −1.4e−03 | | | | | | | | |

[14th line]

| | | | | | | | | |
|---|---|---|---|---|---|---|---|---|
| 2.4e−02 | −1.4e−03 | 2.6e−03 | −1.2e−03 | 2.8e−04 | −4.1e−05 | −1.4e−03 | 5.8e−04 | −1.2e−03 |
| −8.7e−04 | 1.3e−03 | 1.4e−03 | 4.1e−03 | −1.2e−03 | −4.7e−04 | −2.0e−04 | −8.1e−04 | −5.0e−04 |
| 4.0e−03 | 7.2e−04 | −8.6e−04 | −1.2e−03 | −1.6e−03 | −9.4e−04 | 8.2e−04 | 2.3e−04 | −7.9e−04 |

TABLE 16 covariance matrix C (continued)

[15th line]

| | | | | | | | | |
|---|---|---|---|---|---|---|---|---|
| 2.5e−02 | 2.7e−04 | −1.5e−03 | 6.6e−04 | −7.3e−04 | −1.7e−03 | 1.4e−03 | −1.5e−03 | 1.7e−03 |
| −8.3e−04 | 2.4e−03 | −1.6e−03 | −1.5e−03 | 9.5e−04 | −8.4e−05 | 1.0e−03 | 4.1e−03 | 3.0e−04 |
| 3.8e−03 | 2.3e−04 | −1.3e−03 | 1.9e−04 | −1.7e−03 | 2.3e−03 | −1.1e−03 | −4.0e−04 | |

[16th line]

| | | | | | | | | |
|---|---|---|---|---|---|---|---|---|
| 2.1e−02 | −1.7e−03 | 1.8e−03 | 1.1e−03 | 2.4e−03 | 5.7e−03 | −1.7e−03 | 5.5e−04 | −1.0e−03 |
| 2.8e−03 | −1.4e−03 | −1.7e−03 | −1.4e−03 | 1.7e−03 | 4.5e−03 | 2.4e−03 | 1.5e−04 | 6.7e−04 |
| 8.9e−05 | 5.1e−06 | 2.1e−03 | −2.0e−04 | 1.0e−03 | 2.7e−03 | 6.4e−04 | | |

[17th line]

| | | | | | | | | |
|---|---|---|---|---|---|---|---|---|
| 3.4e−02 | −4.8e−04 | −8.2e−04 | −7.4e−04 | −9.2e−04 | −1.3e−03 | −1.4e−03 | −1.7e−03 | −1.7e−03 |
| −1.7e−03 | −1.3e−03 | −1.4e−03 | −1.4e−03 | −1.7e−03 | −1.7e−03 | −1.4e−03 | −1.6e−03 | −8.9e−04 |
| −1.3e−03 | −1.7e−03 | −1.4e−03 | −1.5e−03 | −1.3e−03 | −1.1e−03 | | | |

[18th line]

| | | | | | | | | |
|---|---|---|---|---|---|---|---|---|
| 2.3e−02 | −1.0e−05 | −6.5e−04 | 6.0e−03 | −1.2e−03 | 1.6e−04 | −1.2e−03 | 1.5e−03 | −1.3e−03 |
| −1.2e−03 | −7.2e−04 | 4.5e−03 | 1.6e−04 | 1.3e−03 | 2.3e−03 | −6.8e−04 | −7.0e−04 | −6.3e−04 |
| 4.4e−04 | −1.3e−03 | −3 0e−04 | 1.6e−03 | 1.2e−03 | | | | |

[20th line]

| | | | | | | | | |
|---|---|---|---|---|---|---|---|---|
| 2.6e−02 | 5.4e−04 | −8.9e−04 | −1.5e−03 | 2.5e−03 | 8.5e−04 | −4.8e−04 | 6.6e−03 | −1.5e−03 |
| −9.4e−04 | 1.0e−03 | 4.9e−04 | 2.9e−03 | −1.0e−03 | 2.3e−03 | 3.9e−03 | −6.0e−04 | 4.0e−03 |
| 1.7e−03 | −1.1e−03 | 3.8e−03 | −9.2e−04 | | | | | |

[21th line]

| | | | | | | | | |
|---|---|---|---|---|---|---|---|---|
| 2.5e−02 | 1.5e−03 | −1.5e−03 | −9.0e−04 | 2.3e−03 | −8.8e−04 | −1.3e−03 | −1.5e−03 | −1.4e−04 |
| −1.6e−03 | 4.1e−03 | 4.1e−04 | −4.3e−04 | −2.9e−04 | −4.5e−04 | 1.1e−03 | 6.3e−03 | 3.8e−03 |
| −3.2e−04 | −1.5e−03 | −1.3e−03 | | | | | | |

TABLE 17 covariance matrix C (continued)

[22th line]

| | | | | | | | | |
|---|---|---|---|---|---|---|---|---|
| 2.1e−02 | −1.6e−03 | 5.5e−05 | 1.4e−03 | 1.7e−03 | 2.7e−03 | −1.6e−03 | −4.8e−04 | 1.1e−03 |
| −6.1e−06 | 4.0e−0.3 | 4.0e−03 | 3.9e−03 | −1.0e−03 | −1.1e−03 | 1.3e−03 | 1.9e−03 | −8.9e−04 |
| 1.6e−05 | 1 6e−03 | | | | | | | |

[23th line]

| | | | | | | | | |
|---|---|---|---|---|---|---|---|---|
| 3.4e−02 | −6.4e−04 | −1.0e−03 | −9.9e−04 | −9.7e−04 | −1.3e−03 | −1.4e−03 | −1.4e−03 | −1.7e−03 |
| −1.7e−03 | −1.4e−03 | −1.6e−03 | −8.9e−04 | −1 3e−03 | −1.7e−03 | −1.4e−03 | −1 5e−03 | −1.3e−03 |
| −1.1e−03 | | | | | | | | |

[24th line]

| | | | | | | | | |
|---|---|---|---|---|---|---|---|---|
| 2.5e−02 | −2 0e−04 | 2.0e−03 | 2.4e−03 | −1.4e−03 | 2.5e−03 | 6.6e−04 | 1.2e−03 | −1.8e−03 |
| 1.8e−03 | 8.4e−04 | 1 2e−03 | 1.9e−03 | 6.0e−04 | 4.9e−03 | 2 9e−03 | −3 3e−04 | 1.7e−03 |

[25th line]

| | | | | | | | | |
|---|---|---|---|---|---|---|---|---|
| 2.8e−02 | 2.1e−03 | 2.7e−03 | −1.7e−03 | 2.2e−03 | 1.1e−03 | 4.8e−03 | 3.7e−03 | 2.4e−03 |
| 1.7e−03 | −5 7e−04 | 1.9e−04 | −1.3e−03 | 6.9e−03 | −3.7e−04 | 1.8e−03 | −1.5e−03 | |

[26th line]

| | | | | | | | | |
|---|---|---|---|---|---|---|---|---|
| 2 7e−02 | 5 3e−03 | −1.7e−03 | 5.8e−04 | −3.8e−04 | 2.0e−03 | 2.7e−03 | 1.5e−04 | 1.1e−03 |
| 6.6e−04 | 5.1e−06 | −3.6e−04 | 3.8e−03 | 1.7e−03 | 9.4e−04 | 3.1e−03 | | |

[27th line]

| | | | | | | | | |
|---|---|---|---|---|---|---|---|---|
| 2.8e−02 | −1.7e−0.3 | −1.0e−04 | −5.7e−04 | 1.3e−03 | −8.3e−04 | −5.3e−04 | 1.1e−03 | 8 2e−04 |
| 9.6e−04 | −1.5e−03 | 2.7e−03 | −1.6e−03 | −8.9e−04 | −1.5e−03 | | | |

[27th line]

| | | | | | | | | |
|---|---|---|---|---|---|---|---|---|
| 3.4e−02 | −6 6e−04 | −6 9e−04 | −1.0e−0.3 | −9 9e−04 | −1.4e−03 | −1.6e−03 | −8.9e−04 | −1.3e−03 |
| −1.7e−03 | −1 4e−03 | −1 5e−03 | −1.3e−03 | −1.1e−03 | | | | |

[28th line]

| | | | | | | | | |
|---|---|---|---|---|---|---|---|---|
| 2.5e−02 | −2 3e−04 | 9.8e−04 | 1.6e−03 | 5.5e−03 | 2.2e−03 | −6 8e−04 | 1.5e−03 | 5.4e−03 |
| 2.2e−03 | 5 1e−03 | 2.8e−03 | 7.9e−04 | | | | | |

TABLE 18 covariance matrix C (continued)

[29th line]

| | | | | | | | | |
|---|---|---|---|---|---|---|---|---|
| 2.5e−02 | 1.9e−03 | 3.8e−03 | 3.4e−04 | 4.9e−04 | −2.7e−04 | 6.0e−04 | −1.6e−03 | 4.1e−03 |
| 6.8e−03 | 9.0e−04 | 1.3e−03 | | | | | | |

[30th line]

| | | | | | | | | |
|---|---|---|---|---|---|---|---|---|
| 2.7e−02 | 2.5e−04 | 1.3e−04 | 9.2e−04 | 1.6e−03 | −1.1e−03 | 4.0e−03 | −6.6e−04 | 1.5e−03 |
| −1.2e−03 | −1.5e−03 | | | | | | | |

[31th line]

| | | | | | | | | |
|---|---|---|---|---|---|---|---|---|
| 2.9e−02 | 4.6e−03 | 4.0e−03 | 9.5e−04 | 1.0e−03 | 1.2e−03 | 6.6e−04 | −1.5e−03 | −9.2e−04 |
| −6.5e−04 | | | | | | | | |

[32th line]

| | | | | | | | |
|---|---|---|---|---|---|---|---|
| 2.0e−02 | 2.8e−03 | 2.5e−03 | −8.8e−04 | 9.2e−04 | −1.1e−04 | 3.9e−03 | 6.7e−05 | 2.9e−04 |

[33th line]

| | | | | | | | |
|---|---|---|---|---|---|---|---|
| 2.7e−02 | 1.1e−03 | 3.0e−03 | 2.6e−03 | −4.0e−04 | −2.4e−04 | −1.3e−03 | −8.2e−06 |

[34th line]

| | | | | | | |
|---|---|---|---|---|---|---|
| 1.7e−02 | 3.5e−03 | 9.8e−04 | −1.0e−03 | −9.3e−04 | −9.3e−04 | −7.1e−04 |

[35th line]

| | | | | | |
|---|---|---|---|---|---|
| 2.4e−02 | 7.0e−04 | 5.7e−04 | −1.4e−03 | 5.3e−04 | −1.1e−03 |

TABLE 19 covariance matrix C (continued)

[36th line]

| 2.6e-02 | -1.4e-04 | -4.2e-04 | 1.8e-03 | 1.4e-03 |
|---|---|---|---|---|

[37th line]

| 2.6e-02 | -1.4e-03 | 1.1e-03 | -1.1e-04 | |

[38th line]

| 2.6e-02 | 2.4e-03 | 1.2e-03 | | |

[39th line]

| 2.0e-02 | 3.5e-03 | | | |

[40th line]

| 2.3e-02 | | | | |

Figure 28:
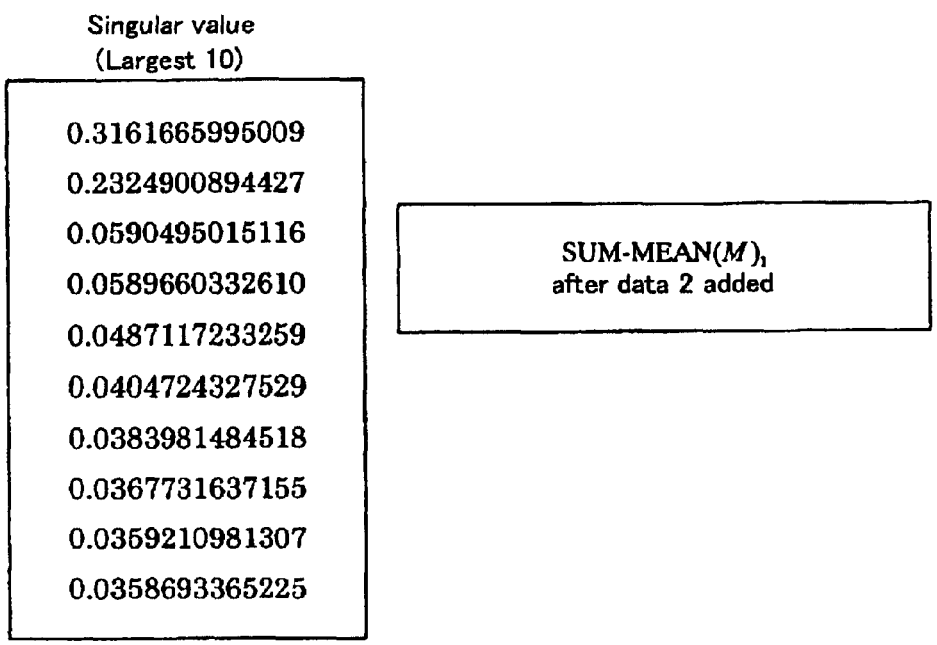
FIG. 28 is a view showing a singular vector obtained by using an updated covariance matrix.

FIG. 28 shows results of calculating first ten singular values and singular vectors for the maximum singular value by executing the singular value decomposition using a covariance matrix C' calculated by the above serial updating. Further, Table 20 shows the singular vectors (for the maximum singular value).

TABLE 20

[singular vector for first singular value] (N = 40 dimension)

| -5.2960e-01 | -3.8319e-01 | -5.2864e-02 | -3.2729e-02 | -3.1732e-02 |
|---|---|---|---|---|
| -2.6187e-01 | 5.2893e-01 | 3.8302e-01 | 3.6178e-02 | 5.7374e-02 |
| 2.6109e-01 | 3.1860e-05 | 4.9484e-05 | 3.5469e-05 | 4.4623e-05 |
| 5.2818e-05 | 3.1851e-05 | 3.6387e-05 | 4.8000e-05 | 4.3140e-05 |
| 5.1465e-05 | 3.1915e-05 | 4.2917e-05 | 5.5013e-05 | 5.4694e-05 |
| 5.1524e-05 | 3.1898e-05 | 4.3605e-05 | 4.3651e-05 | 5.4658e-05 |
| 5.5368e-05 | 4.3439e-05 | 5.1774e-05 | 2.6056e-05 | 3.7219e-05 |
| 5.1642e-05 | 4.4973e-05 | 4.7018e-05 | 3.9580e-05 | 3.2341e-05 |

FIG. 29 shows results of calculating a covariance matrix directly when the data shown in Tables 5 to 10 is provided by the conventional method (when the total number of documents and the total number of keywords are known in advance), and obtaining singular values (ten largest values) and singular vectors for the maximum singular value by executing the singular value decomposition on the covariance matrix.

Further, Table 21 shows the singular vectors (N=40 dimensions) for the first singular value.

TABLE 21

[singular vector for first singular value] (N = 40 dimension)

| -5.2960e-01 | -3.8319e-01 | -2.6187e-01 | -5.2864e-02 | -3 2729e-02 |
|---|---|---|---|---|
| -3.1732e-02 | 5.2893e-01 | 2.6109e-01 | 3.8302e-01 | 3 6178e-02 |
| 5 7374e-02 | 3.1860e-05 | 3.1851e-05 | 3.1915e-05 | 3.1898e-05 |
| 4.2917e-05 | 4.3605e-05 | 4.9484e-05 | 3.6387e-05 | 5.1774e-05 |
| 3.5469e-05 | 4.8000e-05 | 5.5013e-05 | 4.6623e-05 | 4.3651e-05 |
| 5.1642e-05 | 4.7018e-05 | 4.3140e-05 | 5.4694e-05 | 5.4658e-05 |
| 3.2341e-05 | 2.6056e-05 | 5.1465e-05 | 3.9580e-05 | 5.2818e-05 |
| 4.3439e-05 | 5.1524e-05 | 5.5368e-05 | 3.7219e-05 | 4.4973e-05 |

As a result of comparing the above Operative Example 3 and Comparative Example 3, it was known that the singular values obtained by the method according to the present invention are identical to those obtained by executing the singular value decomposition on the covariance matrix created from entire data.

Further, with regard to the maximum singular value, the third element of singular vectors for the maximum singular value obtained by the conventional method is, for example, -2.6187e-01 and it was known that this third element corresponds to the sixth element of singular vectors for the maximum singular value obtained by the method according to the present invention. That is to say, it was known that the singular vectors for the maximum singular values obtained by both methods were identical except for permutations thereof.

Operative Example 4

Downdate Example

As Operative Example 4, downdating of documents from a database by deleting data dated Jul. 1, 2001 (data1) and Jul. 2, 2001 (data2) from the data used in Operative Example 1 was studied. Since this is downdating, SUM-MEAN$(M)_1$ and SUM$(M)_1$ were updated as first processing. For this updating, data1 and data2 were primarily scanned and SUM-MEAN$(D)_1$ and SUM$(D)_1$ were created first. D represents the number of documents to be deleted. SUM-MEAN$(D)_1$ and SUM$(D)_1$ represent a mean vector (N dimensions) of documents to be deleted and a product sum matrix component (a symmetric matrix of N×N), respectively.

Specifically, SUM-MEAN$(D)_1$ and SUM$(D)_1$ were obtained and thereafter new SUM-MEAN$(M)_1$ and new SUM$(M)_1$ were obtained from the following formula.

SUM-MEAN$(M)_1$=SUM-MEAN$(M)_1$−SUM-MEAN$(D)_1$

SUM$(M)_1$=SUM$(M)_1$−SUM$(D)_1$     [Formula 16]

The above formula is a subtraction of an N-dimension vector, that is to say, a subtraction of a symmetric matrix of N×N (for each element). The first step of updating SUM-MEAN(M) and SUM$(M)_1$ is thus ended.

Thereafter, since some keywords might have been deleted and no more necessarily retained in the keyword hash table, these keywords were investigated by scanning D documents again. In Operative Example 3, keywords shown in FIG. 30 were detected along with deletion of data1 and data2.

With regard to SUM-MEAN$(M)_1$, elements of index positions corresponding to the above keywords were deleted (these elements are referred to as ($i_1$, $i_2$, $i_3$, $i_4$, $i_5$, $i_6$)). Consequently, 34-dimension vectors decreased for an amount corresponding to six keywords were obtained. With regard to SUM$(M)_1$, elements in a vertical direction and a horizontal direction of a matrix corresponding to the six indices were deleted. For example, all elements having row numbers or column numbers $i_1$ in SUM$(M)_1$ were deleted with regard to an index $i_1$ for "AlGore". At this time, an N×N matrix was generated as a (N−1)×(N−1) matrix. Finally, SUM$(M)_1$ was generated as a (N−6)×(N−6) matrix.

The above deletion was repeated up to index $i_6$ corresponding to "Japan". When this process was ended, updating of SUM-MEAN$(M)_1$ and SUM$(M)_1$ was ended. Consequently, SUM-MEAN$(M)_1$ and SUM$(M)_1$ each comprising vectors having 34 dimensions, which were 6 dimensions fewer than original 40 dimensions, were obtained.

Finally, SUM$(M)_2$ was calculated with the same formula as that used for updating to obtain a covariance matrix and the singular value decomposition was executed on the covariance matrix to obtain singular values (ten largest values) and singular vectors for the maximum singular value. FIG. 31 shows the results. Further, Table 22 shows singular vectors (N=34 dimensions) for the first singular value.

TABLE 22

[singular vector for first singular value] (N = 34 dimension)

| 6.6945e−01 | 1.7290e−01 | 2.6265e−02 | 6.7805e−02 | 6.6945e−01 | −2.1384e−02 |
|---|---|---|---|---|---|
| −5.6159e−02 | −3.5503e−02 | −4.6750e−02 | −5.8561e−02 | −2.1388e−02 | −3.9300e−02 |
| −5.4406e−02 | −4.5086e−02 | −5.8817e−02 | −2.1630e−02 | −4.9441e−02 | −6.3746e−02 |
| −6.3778e−02 | −5.6538e−02 | −2.1591e−02 | −5.0169e−02 | −4.8973e−02 | −6.2525e−02 |
| −6.6006e−02 | −4.9784e−02 | −5.9844e−02 | −2.6616e−02 | −3.7788e−02 | −5.7980e−02 |
| −5.1621e−02 | −5.1754e−02 | −4.1644e−02 | −3.2110e−02 | | |

Further, FIG. 32 shows singular values (ten largest values) obtained by executing the SVD after calculating covariance matrices at one time assuming that all matrices summarizing data3 to data7 have the same formats as those shown in Tables 5 to 10 as Comparative Example 4. Still further, Table 23 shows results of obtaining the singular vectors for the maximum singular value.

TABLE 23

[singular vector for first singular value] (N = 34 dimension)

| 6.6945e−01 | 6.6945e−01 | 1.7290e−01 | 2.6265e−02 | 6.7805e−02 | −2.1384e−02 |
|---|---|---|---|---|---|
| −2.1388e−02 | −2.1630e−02 | −2.1591e−02 | −4.9441e−02 | −5.0169e−02 | −5.6159e−02 |
| −3.9300e−02 | −5.9844e−02 | −3.5503e−02 | −5.4406e−02 | −6.3746e−02 | −4.6750e−02 |
| −4.8973e−02 | −5.7980e−02 | −5.1754e−02 | −4.5086e−02 | −6.3778e−02 | −6.2525e−02 |
| −3.2110e−02 | −2.6616e−02 | −5.8817e−02 | −4.1644e−02 | −5.8561e−02 | −4.9784e−02 |
| −5.6538e−02 | −6.6006e−02 | −3.7788e−02 | −5.1621e−02 | | |

From comparison of results of Operative Example 4 and Comparative Example 4, it can be known that ten singular values from the maximum value are identical to those obtained by the conventional method. Further, from comparison of the singular vectors for the maximum singular value obtained by the method according to the present invention and the singular vectors obtained by the conventional method, it was known that both singular vectors are almost identical except for orders thereof. For example, a second vector element 1.7290e−01 of the singular vector obtained in Operative Example 4 corresponds to an element of a third vector obtained by the conventional method (batch method).

A program for executing the above information retrieval according to the present invention may be written using any known language. For example, languages such as the C language, the C++ language or Java™ may be used to write a program for executing the method according to the present invention. Further, the program for executing the method according to the present invention may be stored in a magnetic storage medium readable by a computer such as a floppy™ disk, a hard disk or a magnetic tape, or a storage medium readable by a computer such as a CD-ROM or a DVD.

As described above, a previously calculated result of dimension reduction in a large database wherein documents are updated successively may be used to the execute singular value decomposition efficiently on a document-attribute matrix containing updated documents. Further, efficient and highly precise information retrieval may be executed by retrieving information after deleting dimensions of a document-attribute matrix updated using a singular vector obtained by the method according to the present invention.

The present invention has been described with reference to the embodiments shown in the drawings. However, the present invention is not limited to the embodiments shown in the drawings and various changes or other embodiments may be adopted. For example, in the present invention documents are described as documents in writing and documents usable in the present invention are not limited to documents in writing and may also include audio documents, graphics documents and animation documents.

REFERENCES

10: Computer
12: Database
14: Network
16: Computer

What is claimed is:

1. An information retrieval system for retrieving documents added to a database with respect to time, said documents being converted into a document-attribute matrix and stored within said information retrieval system, and said document-attribute matrix being constituted by document-attribute submatrices added in order with respect to time, said information retrieval system comprising: means for generating and storing a predetermined type matrix from said document-attribute matrix,
   means for executing QR decomposition of said document-attribute matrix and using only a matrix R as said predetermined matrix, wherein the matrix R is an upper triangular matrix obtained by said QR decomposition,
   means for generating a document-attribute submatrix from said documents being added to said database during a specific time period,
   means for updating said predetermined type matrix using knowledge with respect to said document-attribute submatrix and for executing a singular value decomposition on said updated predetermined type matrix to execute dimension reduction of all document-attribute matrices stored within said database, and
   means for retrieving information with respect to a user input query using said dimension reduced document-attribute matrices.

2. The information retrieval system according to claim 1 comprising a means of updating said stored matrix R by a Householder transformation related to said document-attribute submatrices.

3. The information retrieval system according to claim 1 comprising means of:
   generating a covariance matrix as said predetermined matrix from said document-attribute submatrices; and
   retaining a product sum matrix of document vectors (SUM(M)$_1$), a mean value of document vectors (MEAN(M)$_1$), a mean product matrix of document vectors (SUM(M)$_2$) and a total number of documents (M).

4. The information retrieval system according to claim 3 comprising a means of generating a covariance matrix C' of all document-attribute matrices including said added submatrices from the following formula:

$$C' = \frac{1}{(M+H)}\text{SUM}(M+H)_1 - \text{SUM}(M+H)_2$$

(wherein, H represents a number of documents of added submatrices).

5. The information retrieval system according to claim 3 further comprising means of retrieving attributes contained in a document vector automatically and generating an attribute hash table for adding or deleting said attributes.

6. An information retrieval method for retrieving documents added to a database with respect to time, said documents being converted into a document-attribute matrix and stored within an information retrieval system, and said document-attribute matrix being constituted by document-attribute submatrices added in order with respect to time, said information retrieval method comprising the steps of:
   generating and storing a predetermined type matrix from said document-attribute matrix,
   executing QR decomposition of said document-attribute matrix and using only a matrix R as said predetermined matrix, wherein the matrix R is an upper triangular matrix obtained by said QR decomposition,
   generating a document-attribute submatrix from said documents being added to said database during a specific time period,
   updating said predetermined type matrix using knowledge with respect to said document-attribute submatrix and for executing a singular value decomposition on said updated predetermined type matrix to execute dimension reduction of all document-attribute matrices stored within said database, and
   retrieving information with respect to a user input query using said dimension reduced document-attribute matrices.

7. The information retrieval method according to claim 6 comprising a step of updating said stored matrix R by a Householder transformation related to said document-attribute submatrices.

8. The information retrieval method according to claim 6 comprising the steps of:
   generating a covariance matrix as said predetermined matrix from said document-attribute submatrices; and
   retaining a product sum matrix of document vectors (SUM(M)$_1$), a mean value of document vectors (MEAN(M)$_1$), a mean product matrix of document vectors (SUM(M)$_2$) and a total number of documents (M).

9. The information retrieval method according to claim 8 comprising a step of a generating covariance matrix C' of all a document-attribute matrix including said added submatrices from the following formula:

$$C' = \frac{1}{(M+H)}\text{SUM}(M+H)_1 - \text{SUM}(M+H)_2$$

(wherein, H represents a number of documents of added submatrices).

10. The information retrieval method according to claim 8 further comprising the steps of:
    retrieving attributes contained in a document vector automatically and
    generating an attribute hash table for adding or deleting said attributes.

11. A program stored in a storage medium for retrieving documents added to a database with respect to time, said documents being converted into a document-attribute matrix and stored within an information retrieval system, and said document-attribute matrix being constituted by document-attribute submatrices added in order with respect to time, said program making a computer execute the steps of:
    generating and storing a predetermined type matrix from said document-attribute matrix,
    executing QR decomposition of said document-attribute matrix and using only a matrix R as said predetermined matrix, wherein the matrix R is an upper triangular matrix obtained by said QR decomposition,
    generating a document-attribute submatrix from said documents being added to said database during a specific time period,
    updating said predetermined type matrix using knowledge with respect to said document-attribute submatrix and for executing a singular value decomposition on said updated predetermined type matrix to execute dimension reduction of all document-attribute matrices stored within said database, and
    retrieving information with respect to a user input query using said dimension reduced document-attribute matrices.

12. The program according to claim 11 for making a computer execute a step of updating said stored matrix R by a Householder transformation related to said document-attribute submatrices.

13. The program according to claim 11 for making a computer execute the steps of:
    generating a covariance matrix as said predetermined matrix from said document-attribute submatrices, and
    retaining a product sum matrix of document vectors (SUM(M)$_1$), a mean value of document vectors (MEAN(M)$_1$), a mean product matrix of document vectors (SUM(M)$_2$) and a total number of documents (M).

14. The program according to claim 13 for making a computer execute a step of generating a covariance matrix C' of all a document-attribute matrix including said added submatrices from the following formula:

$$C' = \frac{1}{(M+H)}\text{SUM}(M+H)_1 - \text{SUM}(M+H)_2$$

(wherein, H represents a number of documents of added submatrices).

15. The program according to claim 14 for further making a computer execute steps of
- retrieving an attribute contained in a document vector automatically; and
- generating an attribute hash table to add or delete said attribute.

16. A storage medium readable by a computer wherein a program for making a computer execute an information retrieval method to retrieve documents added to a database with respect to time, said documents being converted into a document-attribute matrix and stored within an information retrieval system, and said document-attribute matrix being constituted by document-attribute submatrices added in order with respect to time, said program making a computer execute said information retrieval method comprising the steps of:
- generating and storing a predetermined type matrix from said document-attribute matrix,
- executing QR decomposition of said document-attribute matrix and using only a matrix R as said predetermined matrix, wherein the matrix R is an upper triangular matrix obtained by said OR decomposition,
- generating a document-attribute submatrix from said documents being added to said database during a specific time period,
- updating said predetermined type matrix using knowledge with respect to said document-attribute submatrix and for executing a singular value decomposition on said updated predetermined type matrix to execute dimension reduction of all document-attribute matrices stored within said database, and
- retrieving information with respect to a user input query using said dimension reduced document-attribute matrices.

17. The storage medium according to claim 16 making a computer execute a step of updating said stored matrix R by a Householder transformation related to said document-attribute submatrices.

18. The storage medium according to claim 16 making a computer execute a step of generating a covariance matrix as said predetermined matrix from said document-attribute submatrices and retaining a product sum matrix of document vectors $(SUM(M)_1)$ a mean value of document vectors $(MEAN(M)_1)$, a mean product matrix of document vectors $(SUM(M)_2)$ and a total number of documents (M).

19. The storage medium according to claim 18 making a computer execute a step of generating a covariance matrix C' of all a document-attribute matrix including added said submatrices from the following formula:

$$C' = \frac{1}{(M+H)} \text{SUM}(M+H)_1 - \text{SUM}(M+H)_2$$

(wherein, H represents a number of documents of added submatrices).

20. The storage medium according to claim 18 further making a computer execute the steps of:
- retrieving an attribute contained in a document vector, and
- generating an attribute hash table to add or delete said attribute.

* * * * *